(12) United States Patent
Harada et al.

(10) Patent No.: US 6,777,850 B2
(45) Date of Patent: Aug. 17, 2004

(54) STATOR AND STATOR CORE FOR A DYNAMOELECTRIC MACHINE AND A METHOD FOR MANUFACTURE THEREOF

(75) Inventors: Yoshihiro Harada, Tokyo (JP); Kensaku Kuroki, Tokyo (JP); Yoshihito Asao, Tokyo (JP); Katsumi Adachi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 139 days.

(21) Appl. No.: 09/993,624

(22) Filed: Nov. 27, 2001

(65) Prior Publication Data
US 2002/0140315 A1 Oct. 3, 2002

(30) Foreign Application Priority Data
Mar. 28, 2001 (JP) ........................................ 2001-093425

(51) Int. Cl.[7] .............................................. H02K 15/02
(52) U.S. Cl. ........................................ 310/254; 310/216
(58) Field of Search ................................. 310/216, 217, 310/218, 254; 290/596; H02K 15/02

(56) References Cited

U.S. PATENT DOCUMENTS

| 5,554,902 | A | * | 9/1996 | Kessens et al. | ............. 310/254 |
| 6,337,529 | B1 | * | 1/2002 | Higashino et al. | .......... 310/254 |
| 6,459,187 | B1 | * | 10/2002 | Oohashi et al. | ............. 310/216 |

FOREIGN PATENT DOCUMENTS

| JP | 9-103052 | 4/1997 | .......... H02K/15/02 |
| JP | 3078288 | 8/2000 | .......... H02K/19/22 |

* cited by examiner

*Primary Examiner*—Burton S. Mullins
*Assistant Examiner*—Nguyen Hanh
(74) *Attorney, Agent, or Firm*—Sughrue Mion, PLLC

(57) ABSTRACT

A stator core is prepared into a cylindrical shape by abutting four arc-shaped laminated core divisions and welding an outer surface and an inner surface of the abutted portions. Each of the laminated core divisions is prepared by bending into an arc shape a rectangular parallelepiped laminated body formed by laminating thin magnetic plates. Second outer plate-joining weld portions are applied at positions dividing the outer surface of the laminated body into three sections, and first inner and outer plate-joining weld portions are applied to the inner surface and the outer surface in the vicinity of end portions of the laminated body.

16 Claims, 14 Drawing Sheets

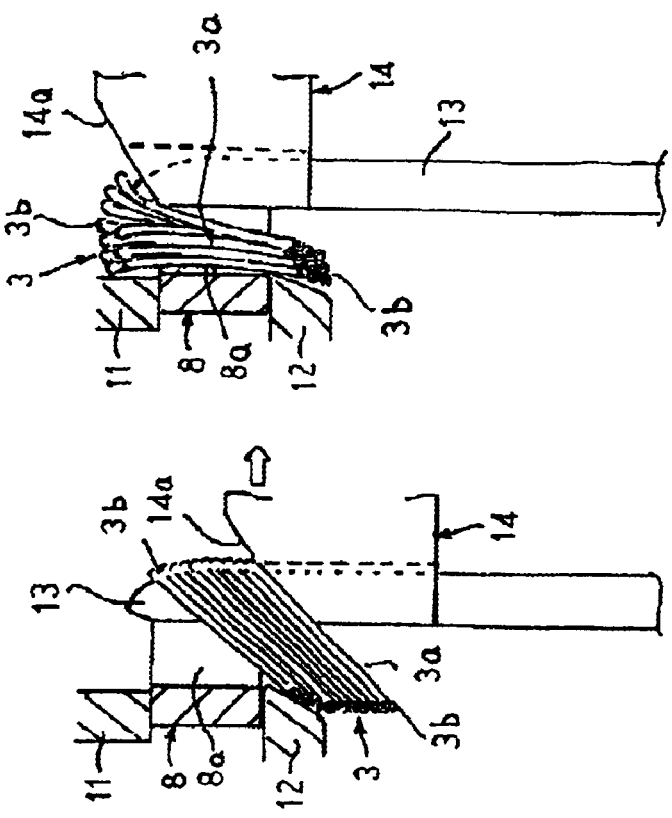
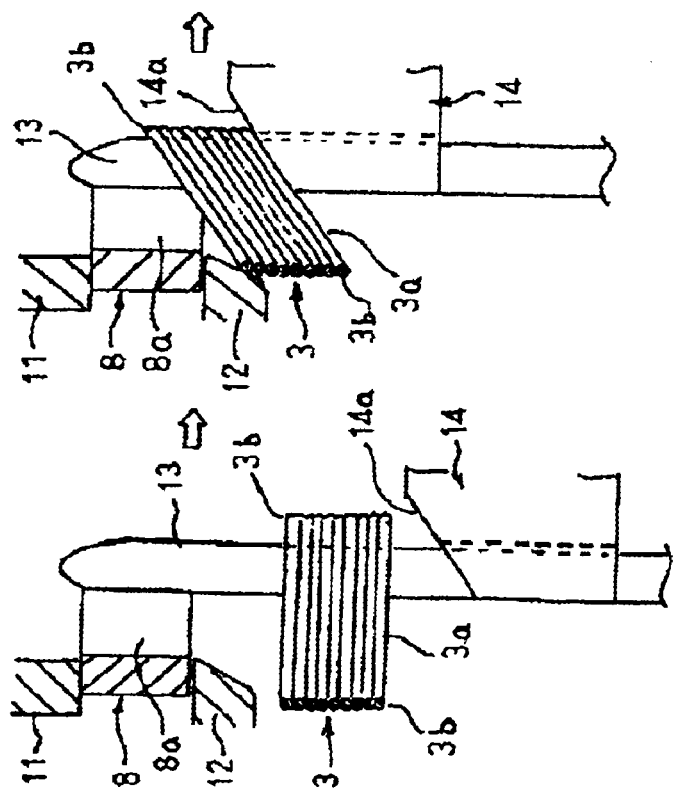

STATOR AND STATOR CORE FOR A DYNAMOELECTRIC MACHINE AND A METHOD FOR MANUFACTURE THEREOF

This application is based on Application No. 2001-093425, filed in Japan on Mar. 28, 2001, the contents of which are hereby incorporated by reference.

BACKGROUND OF THE INVENTION

1. Field of the Invention

The present invention relates to a stator and a stator core used in a dynamoelectric machine such as an automotive alternator and a method for manufacture thereof, and particularly to a stator core construction.

2. Description of the Related Art

In a dynamoelectric machine such as an automotive alternator, reductions in size and increases in output are in demand. Various proposals have been made which attempt to achieve reductions in size and increases in output by raising the space factor of electrical conductors housed in magnetic circuits of stators, and in addition, by aligning in rows and increasing the density of coil ends of stator windings (crossover portions of a stator winding which are constructed at end surfaces of a stator core). Stator cores are normally prepared by laminating thin magnetic plates in the order of 0.3 to 1.0 mm in order to suppress core loss.

FIG. 16 is a perspective showing a conventional stator for an automotive alternator, FIG. 17 is a diagram explaining a method for manufacturing a stator winding used in the conventional stator for an automotive alternator, FIG. 18 is a perspective showing a laminated body constituting a stator core used in the conventional stator for an automotive alternator, FIG. 19 is a perspective showing the stator core used in the conventional stator for an automotive alternator, and FIGS. 20A to 20D are process cross sections explaining a method for mounting the stator winding to the stator core in the conventional stator for an automotive alternator.

Here, a method for manufacturing the conventional stator will be explained with reference to FIGS. 17 to 20D.

First, as shown in FIG. 17, an annular winding unit 2 is prepared by winding one strand of a conductor wire 1 coated with an electrical insulator for a predetermined number of winds, and a star-shaped winding unit 3 is prepared by forming the annular winding unit 2 into a star shape in which end portions of adjacent pairs of slot-housed portions 3a are alternately linked on an inner circumferential side and an outer circumferential side by linking portions 3b.

Next, although not shown, thin magnetic plates of predetermined length are prepared by press forming a strip-shaped body composed of a magnetic material. A plurality of plate teeth are formed at a predetermined pitch in a longitudinal direction on the thin magnetic plates. Plate teeth at first and second ends are formed into two matching sections.

A laminated body 5 is prepared as shown in FIG. 18 by laminating a predetermined number of the thin magnetic plates 4 prepared in this manner such that the plate teeth are superposed, and integrating the laminated thin magnetic plates 4 by welding predetermined positions on an outer surface thereof (the surface on the opposite side from the teeth). Plate-joining weld portions 6 are formed over an entire width region of the laminated body 5 at positions that divide the longitudinal direction of the laminated body 5 into four sections (three positions), for example. Body slots 5a are defined by adjacent pairs of body teeth 5b.

Next, the laminated body 5 is bent into an annular shape with openings of the body slots 5a facing an inner circumferential side to obtain a laminated core 7. First and second ends of the annular laminated core 7 are abutted and an outer circumferential surface of the abutted portion 7a is welded to obtain a cylindrical stator core 8, as shown in FIG. 19. A core-joining weld portion 10 is formed over an entire axial region on an outer circumferential surface of the stator core 8. In this stator core 8, one core-joining weld portion 10 and three plate-joining weld portions 6 are formed at an even angular pitch on the outer circumferential surface. Core slots 8a defined by adjacent pairs of core teeth 8b are formed so as to be arranged at an even angular pitch in a circumferential direction with slot grooves lying in an axial direction and slot openings facing an inner circumferential side.

Next, two of the star-shaped winding units 3 are stacked on top of one another such that the slot-housed portions 3a of each are mutually offset by three slots in a circumferential direction. The two star-shaped winding units 3 stacked on top of one another in this manner are set in a winding unit inserter as shown in FIG. 20A. The winding unit inserter is constituted by a core holder 11, a coil holder 12, axially-extending blades 13, a stopper 14, etc. Here, the stator core 8 is supported by the core holder 11 and the coil holder 12, the blades 13 being placed on an inner circumferential surface of the stator core 8 so as to open an opening portion of every third core slot 8a. The two stacked star-shaped winding units 3 are disposed at a lower end of the stator core 8 such that the slot-housed portions 3a thereof are stacked on top of one another in every third core slot 8a relative to the axial direction, and linking portions 3b on the inner circumferential side are positioned on an inclined surface 14a of the stopper 14.

Next, as the stopper 14 is moved upward in FIG. 20B by a driving means (not shown), the linking portions 3b on the inner circumferential side slide over the inclined surface 14a of the stopper 14, are shifted to an outer circumferential side, and eventually come into contact with an inner circumferential surface of the blades 13. As shown in FIGS. 20B and 20C, as the stopper 14 moves further upward, the linking portions 3b on the inner circumferential side move upward along the inner circumferential surface of the blades 13, and the slot-housed portions 3a move upward and gradually incline. Hence, the slot-housed portions 3a are guided by the blades 13 and are gradually housed in the core slots 8a from the opening portions of the core slots 8a. At this time, the linking portions 3b on the outer circumferential side are guided by the coil holder 12 and are gradually shifted upward and to the inner circumferential side. As shown in FIG. 20D, as the stopper 14 moves to tip ends of the blades 13, the linking portions 3b on the inner circumferential side are conveyed along the arc-shaped inner circumferential surface of the blades 13 to an upper end of the stator 8, and the slot-housed portions 3a are conveyed completely inside the core slots 8a. By this first star-shaped winding unit installation process, the two star-shaped winding units 3 are each installed in every third core slot 8a.

Next, the stopper 14 is lowered and the blades 13 are rotated circumferentially by one slot. Hence, the blades 13 are placed on the inner circumferential surface of the stator core 8 so as to open an opening portion of every third core slot 8a in a group of slots in which the star-shaped winding units 3 are not yet installed. As above, two stacked star-shaped winding units 3 are disposed at the lower end of the stator core 8 such that the slot-housed portions 3a thereof are stacked on top of one another in every third core slot 8a relative to the axial direction, and the linking portions 3b on the inner circumferential side are positioned on the inclined surface 14a of the stopper 14. The stopper 14 is raised and the slot-housed portions 3a are conveyed inside the core slots 8a in a similar manner to the first star-shaped winding unit installation process above. By this second star-shaped winding unit installation process, the next two star-shaped winding units 3 are each installed into every third core slot 8a offset by one slot from those of the first star-shaped winding unit installation process. Similarly, a third star-shaped winding unit installation process is performed to install the remaining two star-shaped winding units 3 into every third core slot 8a offset by one slot from those of the second star-shaped winding unit installation process.

After installing the six star-shaped winding units 3 in this manner, a coil end shaping process is performed to prepare a stator 15 composed of a stator winding 9 installed in the stator core 8 as shown in FIG. 16. Distributed wave windings composed of two star-shaped winding units 3 installed in every third core slot 8a each constitute one winding phase portion. In other words, the stator winding 9 is constituted by a three-phase winding, each winding phase portion being constituted by a distributed wave winding.

Hence, because the conventional stator 15 is prepared by installing the stator winding 9 (the star-shaped winding units 3) in the cylindrical stator core 8, the installation operation for the stator winding 9 is complicated, and one problem has been that the rate of production of the stator 15 has been poor.

Thus, in order to improve the rate of production of the stator, as shown in FIG. 21, a method is proposed in Japanese Patent Non-Examined Laid-Open No. 9-103052, for example, in which flat plate-shaped winding units 16 are prepared by winding conductor wires 1 into a wave shape, and the stator is prepared by bending a rectangular parallelepiped laminated body 5 into an annular shape together with the flat plate-shaped winding units 16 after mounting the flat plate-shaped winding units 16 into the laminated body 5.

In the stator 15 used in the conventional automotive alternator, as described above, the stator core 8 is prepared by preparing the rectangular parallelepiped laminated body 5 in which a predetermined number of the thin magnetic plates 4 are laminated, preparing the laminated core 7 by bending the laminated body 5 into the annular shape, and abutting and welding the first and second circumferential ends of the laminated core 7. Stress when bending the laminated body 5 into the annular shape acts to offset first and second longitudinal ends of each of the thin magnetic plates 4 in a circumferential direction. However, in the conventional stator 15, because the plate joining weld portions 6 are formed on the outer surface of the laminated body 5 (the surface on the opposite side from the teeth) across the entire width region of the laminated body 5 in positions which divide the longitudinal direction of the laminated body 5 into four sections (three positions), for example, the thin magnetic plates 4 are not joined at the first and second longitudinal ends of the laminated body 5, and one problem has been that tooth tip surfaces at the first and circumferential ends of the laminated core 7 become irregular, as shown in FIGS. 22 and 23. Irregularities on the tooth tip surfaces arise easily at the axially-outer ends of the stator core 15.

Thus, one problem has been that when the stator winding 9 is installed in the stator core 8 prepared in this manner, the electrically-insulating coating on the conductor wires 1 is damaged by the irregularities on the tooth tip surfaces, making electrical insulation poor due to short-circuiting among the conductor wires 1 and to short-circuiting between the conductor wires 1 and the stator core 8.

Because welding is not applied to the inner circumferential surface of the stator core 8, turning up of the tooth tip ends occurs easily when the stator winding 9 is installed, particularly in the portions where irregularities have occurred on the tooth tip surfaces. Thus, another problem has been that this turning up of the tooth tip ends damages the electrically-insulating coating on the conductor wires 1 during installation of the stator winding 9 and also damages the electrically-insulating coating on the conductor wires 1 after installation, making electrical insulation poor due to short-circuiting among the conductor wires 1 and to short-circuiting between the conductor wires 1 and the stator core 8.

Although turning up of the tooth tip ends occurring when the stator winding 9 is installed can be prevented in the stator proposed as an improvement because the laminated body 5 is bent into an annular shape after mounting the laminated body 5 with the flat plate-shaped winding units 16, one problem has been that the conductor wires 1 of the flat plate-shaped winding units 16 are damaged by irregularities on the tooth tip surfaces arising during bending of the laminated body 5, making electrical insulation poor due to short-circuiting among the conductor wires 1 and to short-circuiting between the conductor wires 1 and the stator core 8.

This tendency toward deterioration in electrical insulation becomes more pronounced as the space factor of the electrical conductors is improved and as the density of the coil ends is increased due to reductions in the size of and increases in the output from dynamoelectric machines.

SUMMARY OF THE INVENTION

The present invention aims to solve the above problems and an object of the present invention is to provide a stator core for a dynamoelectric machine and a method for the manufacture thereof in which the generation of irregularities in tooth tip surfaces at first and second ends of a laminated body during bending of the laminated body is suppressed by applying plate-joining weld portions to outer surfaces and inner surfaces at first and circumferential ends of the laminated body in addition to plate-joining weld portions that are applied at positions on the outer surfaces of the laminated body that divide the longitudinal direction of the laminated body into a plurality of sections.

Another object of the present invention is to provide a stator for a dynamoelectric machine enabling suppression of deterioration of electrical insulation resulting from irregularities in the tooth tip surfaces.

In order to achieve the above object, according to one aspect of the present invention, there is provided a stator core for a dynamoelectric machine, the stator core being formed into a cylindrical shape by abutting at least one laminated core division shaped by bending a rectangular parallelepiped laminated body;

the laminated body being formed by laminating a plurality of thin strip-shaped magnetic plates in which a plurality of teeth extending perpendicular to a longitudinal direction are formed at a predetermined spacing in the longitudinal direction; and a plurality of slots defined by adjacent pairs of the teeth being formed in a circumferential direction of the stator core such that slot grooves lie in an axial direction of the stator core and slot openings face an inner circumferential side of the stator core, wherein an inner and an outer core-joining weld portion for joining and integrating the abutted portion of the laminated core division are formed so as to extend in an axial direction on an inner circumferential side and an outer circumferential side of the abutted portion of the laminated core division, first inner and first outer plate-joining weld portions for joining and integrating the laminated thin magnetic plates are formed so as to extend in the axial direction in proximity to the inner and outer core-joining weld portions on inner circumferential surfaces and outer circumferential surfaces at first and second circumferential end portions of the laminated core division, and a second outer plate-joining weld portion for joining and integrating the laminated thin magnetic plates is formed so as to extend in an axial direction on an outer circumferential surface of the laminated core division.

Weld depths of the first inner and first outer plate-joining weld portions and the second outer plate-joining weld portion may vary relative to an axial direction.

The first inner plate-joining weld portions may be formed on inner circumferential surfaces of tips of the teeth.

The abutted portion of the laminated core division may be positioned on a circumferentially-central portion of one of the teeth, the first inner plate-joining weld portions being formed on mutually opposite sides of the inner core-joining weld portion on the tooth constituting the abutted portion.

Second inner plate-joining weld portions for joining and integrating the laminated thin magnetic plates may be formed so as to extend in an axial direction on inner circumferential surfaces of tips of all of the teeth except for the teeth on which the first inner plate-joining weld portions are formed.

A weld depth of the second inner plate-joining weld portion may vary relative to an axial direction.

The first and second outer plate-joining weld portions may be positioned radially outside the teeth.

According to another aspect of the present invention, there is provided a stator for a dynamoelectric machine including:

a cylindrical stator core in which a plurality of slots defined by adjacent pairs of teeth are formed in a circumferential direction such that slot grooves lie in an axial direction and slot openings face an inner circumferential side; and a stator winding installed in the stator core, wherein the stator core is formed into a cylindrical shape by abutting first and second circumferential end surfaces of a laminated core shaped by bending a rectangular parallelepiped laminated body into an annular shape, the laminated body being formed by laminating a plurality of thin strip-shaped magnetic plates in which a plurality of teeth extending so as to be perpendicular to a longitudinal direction are formed at a predetermined spacing in the longitudinal direction, an inner and an outer core-joining weld portion for joining and integrating the abutted portion of the laminated core are formed so as to extend in an axial direction on an inner circumferential side and an outer circumferential side of the abutted portion of the laminated core, first inner and first outer plate-joining weld portions for joining and integrating the laminated thin magnetic plates are formed so as to extend in the axial direction in proximity to the inner and outer core-joining weld portions on inner circumferential surfaces and outer circumferential surfaces at first and second circumferential end portions of the laminated core, and a second outer plate-joining weld portion for joining and integrating the laminated thin magnetic plates is formed so as to extend in an axial direction on an outer circumferential surface of the laminated core.

Weld depths of the first inner and first outer plate-joining weld portions and the second outer plate-joining weld portion may vary relative to an axial direction.

The first inner plate-joining weld portions may be formed on inner circumferential surfaces of tips of the teeth.

The abutted portion of the laminated core may be positioned on a circumferentially-central portion of one of the teeth, the first inner plate-joining weld portions being formed on mutually opposite sides of the inner core-joining weld portion on the tooth constituting the abutted portion.

Second inner plate-joining weld portions for joining and integrating the laminated thin magnetic plates may be formed so as to extend in an axial direction on inner circumferential surfaces of tips of all of the teeth except for the teeth on which the first inner plate-joining weld portions are formed.

A weld depth of the second inner plate-joining weld portion may vary relative to an axial direction.

The first and second outer plate-joining weld portions may be positioned radially outside the teeth.

The rectangular parallelepiped laminated body may be shaped by bending into an annular shape with the stator winding mounted in the slots.

The stator winding may be installed such that a conductor wire alternately occupies an inner layer and an outer layer in a slot depth direction in the slots at intervals of a predetermined number of slots.

According to yet another aspect of the present invention, there is provided a method for manufacturing a stator core for a dynamoelectric machine including the steps of:

preparing thin magnetic plates of a predetermined length from a strip-shaped body composed of a magnetic material, a plurality of teeth being formed on the thin magnetic plates at a predetermined spacing;

preparing a rectangular parallelepiped laminated body by laminating a predetermined number of the thin magnetic plates such that the teeth are superposed on each other;

forming a second outer plate-joining weld portion by welding a predetermined position on an outer surface of the laminated body so as to extend across an entire width region of the outer surface, the outer surface being on an opposite side from the teeth;

forming first outer plate-joining weld portions by welding a vicinity of first and second longitudinal end portions on the outer surface of the laminated body so as to extend across an entire width region of the outer surface of the laminated body;

forming first inner plate-joining weld portions by welding a vicinity of first and second longitudinal end portions on an inner surface of the laminated body so as to extend across an entire width region of the inner surface of the laminated body;

preparing a laminated core division by bending the laminated body on which the first and the second outer plate-joining weld portions and the first inner plate-joining weld portions are formed; and integrating the laminated core division into a cylindrical shape by abutting at least one of the laminated core divisions and welding an outer surface and an inner surface of the abutted portion thereof so as to extend across an entire axial region of the laminated core division.

The first inner plate-joining weld portions may be formed on inner circumferential surfaces of tips of the teeth.

The abutted portion of the laminated core division may be positioned on a circumferentially-central portion of one of the teeth, the first inner plate-joining weld portions being formed on mutually opposite sides of an inner core-joining weld portion formed by welding the inner surface of the abutted portion on the tooth constituting the abutted portion.

Second inner plate-joining weld portions may be formed by welding inner circumferential surfaces of tips of all of the teeth except for the teeth on which the first inner plate-joining weld portions are formed so as to extend across an entire axial region, formation of the second inner plate-joining weld portions being performed before preparing the laminated core division by bending the laminated body.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 20A is a process cross section explaining a method for mounting the stator winding to the stator core in the conventional stator for an automotive alternator;

FIG. 20B is another process cross section explaining the method for mounting the stator winding to the stator core in the conventional stator for an automotive alternator;

FIG. 20C is yet another process cross section explaining the method for mounting the stator winding to the stator core in the conventional stator for an automotive alternator;

FIG. 20D is yet another process cross section explaining the method for mounting the stator winding to the stator core in the conventional stator for an automotive alternator;

DETAILED DESCRIPTION OF THE PREFERRED EMBODIMENTS

Hereinafter, the preferred embodiments of the present invention will be described in detail by referring to the accompanying drawings.

Embodiment 1

Figure 1:
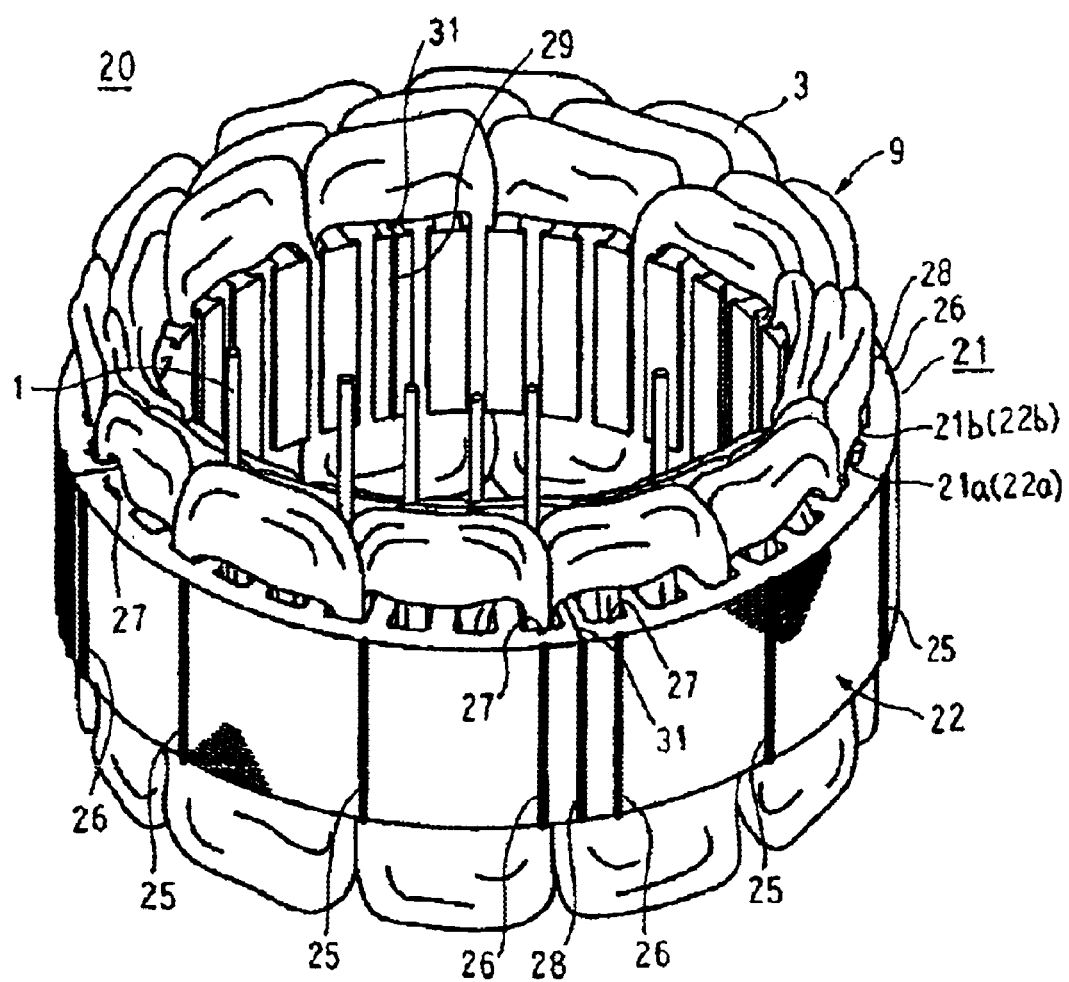
FIG. 1 is a perspective showing a stator for an automotive alternator according to Embodiment 1 of the present invention.
Figure 2:
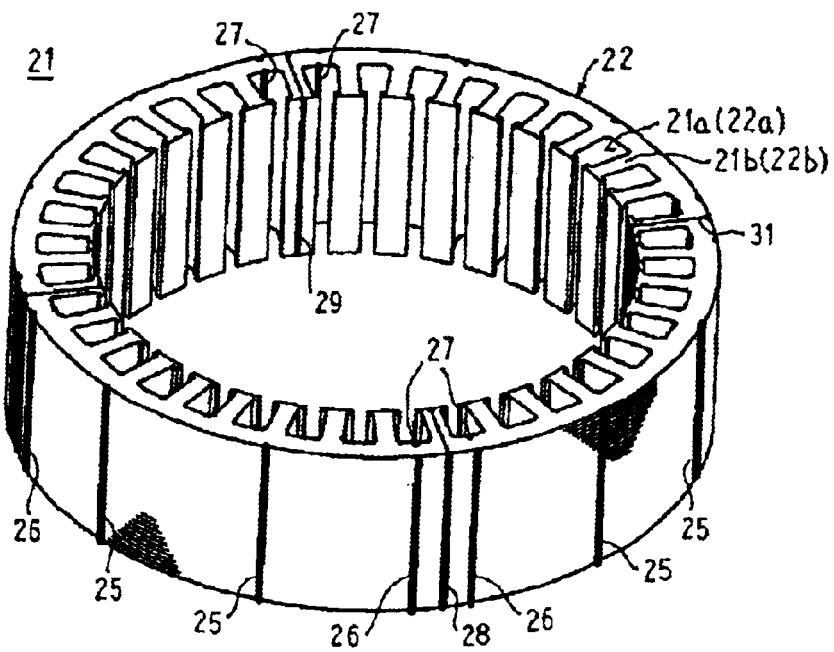
FIG. 2 is a perspective showing a stator core for an automotive alternator according to Embodiment 1 of the present invention.
Figure 3:
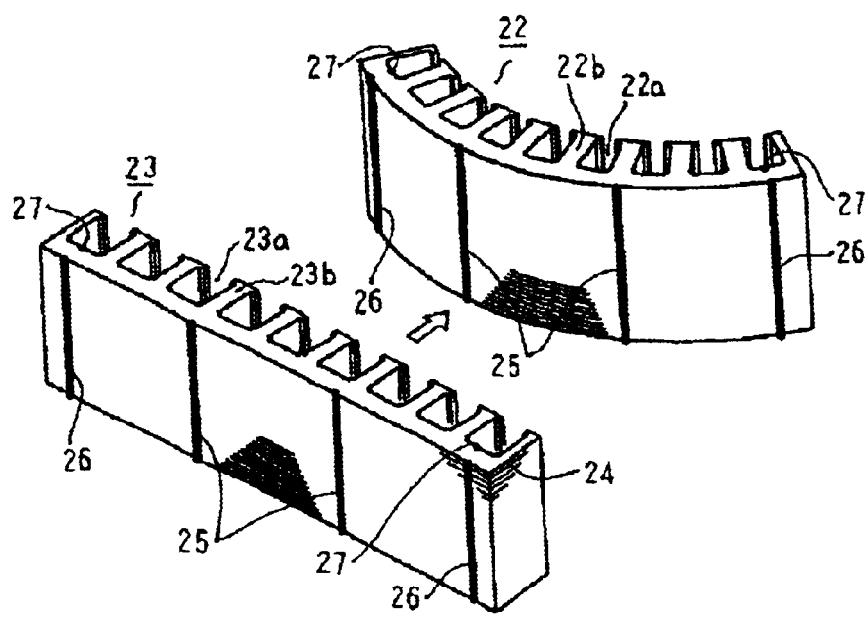
FIG. 3 is a perspective explaining a method for manufacturing the stator core for an automotive alternator according to Embodiment 1 of the present invention.

FIG. 1 is a perspective showing a stator for an automotive alternator according to Embodiment 1 of the present invention, FIG. 2 is a perspective showing a stator core for an automotive alternator according to Embodiment 1 of the present invention, and FIG. 3 is a perspective explaining a method for manufacturing the stator core for an automotive alternator according to Embodiment 1 of the present invention. Moreover, in the figures, portions the same as or corresponding to those in the conventional examples shown in FIGS. 16 to 21 will be given the same numbering, and explanation thereof will be omitted.

In FIG. 1, a stator 20 is constituted by: a cylindrical stator core 21 in which core slots 21a defined by adjacent pairs of core teeth 21b are arranged at a predetermined pitch in a circumferential direction so as to have slot grooves lying in an axial direction and slot openings facing an inner circumferential side; and a stator winding 9 installed in the stator core 21.

As shown in FIG. 2, the stator core 21 is prepared into a cylindrical shape by abutting first and second circumferential ends of four arc-shaped laminated core divisions 22 and welding the abutted portions.

Steps in the preparation of the stator core 21 will now be explained with reference to FIG. 3.

First, thin magnetic plates 24 of predetermined length are prepared by press forming a strip-shaped body composed of a magnetic material. A plurality of plate teeth are formed at a predetermined pitch in a longitudinal direction on the thin magnetic plates 24. Plate teeth at first and second ends are formed into two matching sections.

Next, a laminated body 23 is prepared by laminating a predetermined number of the thin magnetic plates 24 such that the plate teeth are superposed, and integrating the laminated thin magnetic plates 24 by laser welding, for example, predetermined positions on an outer surface (a surface on the opposite side from the teeth) and inner surfaces (surfaces on the same side as the teeth) thereof. On the laminated body 23, second outer plate-joining weld portions 25 are formed on the outer surface of the laminated body 23 over an entire width region of the laminated body 23 at positions that divide the longitudinal direction of the laminated body 23 into three sections (two positions). First outer plate-joining weld portions 26 are formed over an entire width region of the laminated body 23 on the outer surface of the laminated body 23 at positions corresponding to body slots 23a at the first and second ends of the laminated body 23. First inner plate-joining weld portions 27 are formed over an entire width region of the laminated body 23 on the bottom surfaces of the body slots 23a at the first and second ends of the laminated body 23. The body slots 23a are defined by adjacent pairs of body teeth 23b.

Next, the laminated body 23 is bent into an arc shape (a fan shape) with the openings of the body slots 23a facing the inner circumferential side to obtain a laminated core division 22.

First and second circumferential ends of four laminated core divisions 22 prepared in this manner are abutted to each other and outer circumferential surfaces and inner circumferential surfaces of the abutted portions 31 are laser welded, for example, to obtain the cylindrical stator core 21, as shown in FIG. 2. Here, an outer core-joining weld portion 28 is formed over an entire axial region on an outer circumferential surface of each of the abutted portions 31. An inner core-joining weld portion 29 is formed over an entire axial region on an inner circumferential surface of each of the abutted portions 31. Moreover, the inner core-joining weld portions 29 are formed on the tip surfaces of the core teeth 21b so as to join the teeth divided into two matching sections on each adjacent pair of the laminated core divisions 22.

Four outer core-joining weld portions 28 and eight second outer plate-joining weld portions 25 are formed at an even angular pitch on the outer circumferential surface of the stator core 21. Eight first outer plate-joining weld portions 26 are formed in pairs next to the outer core-joining weld portions 28 on first and second circumferential sides of each of the outer core-joining weld portions 28. Four inner core-joining weld portions 29 are formed at an even angular pitch on inner circumferential surfaces of the stator core 21. In addition, eight first inner plate-joining weld portions 27 are formed in pairs on the bottom surfaces of the core slots 21a on first and second circumferential sides of each of the inner core-joining weld portions 29. Here, each of the second outer plate-joining weld portions 25 is formed on an outer circumferential side of a core tooth 21b. The core slots 21a defined by adjacent pairs of the core teeth 21b are formed so as to be arranged at an even angular pitch in a circumferential direction with slot grooves lying in an axial direction and slot openings facing an inner circumferential side.

In the stator core 21 constructed in this manner, because the second outer plate-joining weld portions 25 are formed on the outer circumferential surface of the laminated body 23 (the surface on the opposite side from where the teeth are formed) at positions that divide the longitudinal direction into three sections (two positions), and the first outer plate-joining weld portions 26 are formed on the outer circumferential surface of the laminated body 23 at positions opposite the outermost body slots 23a at the first and second longitudinal ends, and the first inner plate-joining weld portions 27 are formed on the bottom surfaces of the outermost body slots 23a at the first and second longitudinal ends of the laminated body 23, the laminated thin magnetic plates 24 are joined firmly to each other.

Thus, even if stress when bending the laminated body 23 into the arc shape acts to offset the first and second longitudinal ends of each of the thin magnetic plates 24 in a circumferential direction, the tooth tip surfaces at the first and second circumferential ends of the laminated core divisions 22 are prevented from becoming irregular, etc., by the first outer plate-joining weld portions 26 and the first inner plate-joining weld portions 27.

Consequently, if the star-shaped winding units 3 are installed in the stator core 21 formed into a cylindrical shape by abutting the end surfaces of these laminated core divisions 22, the occurrence of damage to the electrically-insulating coating on the conductor wires 1 resulting from irregularities on the tooth tip surfaces can be suppressed, providing a stator 20 having superior electrical insulation.

Because the occurrence of irregularities on the tooth tip surfaces is suppressed, the occurrence of turning up of the tooth tip ends during mounting of the star-shaped winding units 3 resulting from irregularities on the tooth tip surfaces can be suppressed.

When the laminated body 23 is bent, core back portions of the laminated body 23 radially outside the body slots 23a deform to form the arc shape. Here, because the second outer plate-joining weld portions 25 are formed on the outer circumferential surfaces of the laminated body 23 opposite the body teeth 23b, there is no deterioration in bending due to weld hardening at the second outer plate-joining weld portions 25.

Because the second outer plate-joining weld portions 25 are formed on the outer circumferential surfaces of the laminated body 23 opposite the body teeth 23b, the second outer plate-joining weld portions 25 are eliminated from core back portions which are a main passage for magnetic flux, suppressing deterioration of magnetic resistance due to the disposition of the second outer plate-joining weld portions 25.

In addition, because the stator core 21 is prepared from four of the laminated core divisions 22, bending of the laminated body 23 is simplified, improving the rate of production of the laminated core divisions 22.

Embodiment 2

Figure 4:
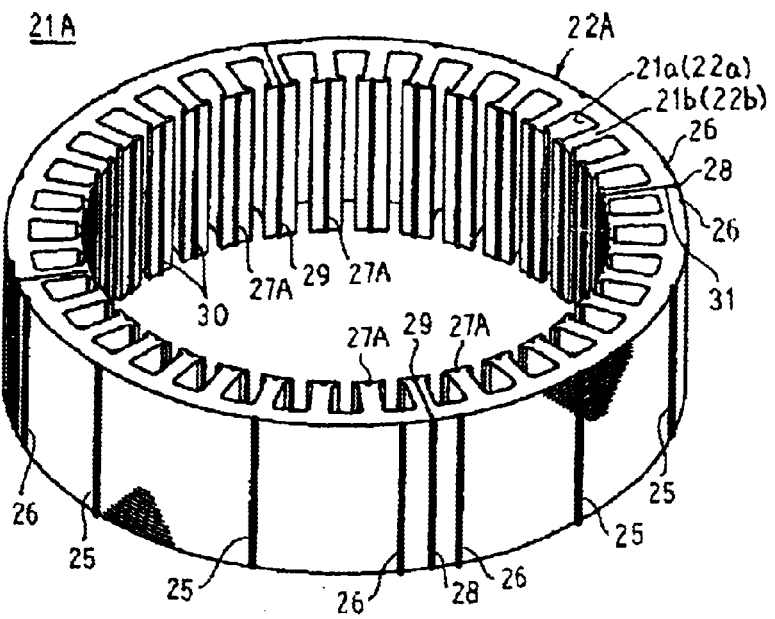
FIG. 4 is a perspective showing a stator core for an automotive alternator according to Embodiment 2 of the present invention.

In Embodiment 2, as shown in FIG. 4, first inner plate-joining weld portions 27A are formed so as to extend in an axial direction on a central portion of the tip surfaces of the second division teeth 22b from the outside at the first and second longitudinal ends of each of four laminated core divisions 22A, and second inner plate joining weld portions 30 are formed so as to extend in an axial direction on a central portion of the tip surfaces of the remaining division teeth 22b. Second outer plate-joining weld portions 25, first outer plate-joining weld portions 26, the first inner plate-joining weld portions 27A, and the second inner plate-joining weld portions 30 are formed by welding at predetermined positions on inner surfaces and outer surfaces of a laminated body formed by laminating a predetermined number of the thin magnetic plates 24.

Moreover, the rest of this embodiment is constructed in a similar manner to Embodiment 1 above.

In Embodiment 2, because the second outer plate-joining weld portions 25, the first outer plate-joining weld portions 26, the first inner plate-joining weld portions 27A, and the second inner plate-joining weld portions 30 are welded at predetermined positions on the inner surfaces and the outer surfaces of a laminated body formed by laminating a predetermined number of the thin magnetic plates 24, the laminated thin magnetic plates 24 are joined firmly to each other.

Thus, in Embodiment 2, the tooth tip surfaces at the first and second circumferential ends of the laminated core divisions 22A are also prevented from becoming irregular, etc., in a similar manner to Embodiment 1 above. In addition, in a stator composed of the star-shaped winding units 3 installed in a stator core 21A constituted by the laminated core divisions 22A, the electrically-insulating coating of the conductor wires 1 is also less likely to be damaged, providing superior electrical insulation.

According to Embodiment 2, because the first and the second inner plate-joining weld portions 27A and 30 are formed on the tip surfaces of all of the core teeth 21b except the core teeth 21b constituting the abutted portions 31, portions of the thin magnetic plates 24 constituting the division teeth 22b, where rigidity is the lowest in the laminated body, are reliably joined, reliably suppressing the occurrence of irregularities in the teeth tip portions when the laminated body is bent.

Because the inner core-joining weld portions 29 and the first and the second inner plate-joining weld portions 27A and 30 are formed on the tip surfaces of all of the core teeth 21b, portions of the thin magnetic plates 24 constituting the core teeth 21b, where rigidity is the lowest in the stator core 21A, are reliably joined, also enabling the occurrence of turning up of the tooth tip ends when the star-shaped winding units 3 are mounted into the stator core 21A to be reliably suppressed.

In addition, because the first and the second inner plate-joining weld portions 27A and 30 are formed on the tip surfaces of all of the core teeth 21b, the first and the second inner plate-joining weld portions 27A and 30 are eliminated from the core back portions which are a main passage for magnetic flux, suppressing deterioration of magnetic resistance due to the disposition of the first and the second inner plate-joining weld portions 27A and 30.

Embodiment 3

Figure 5:
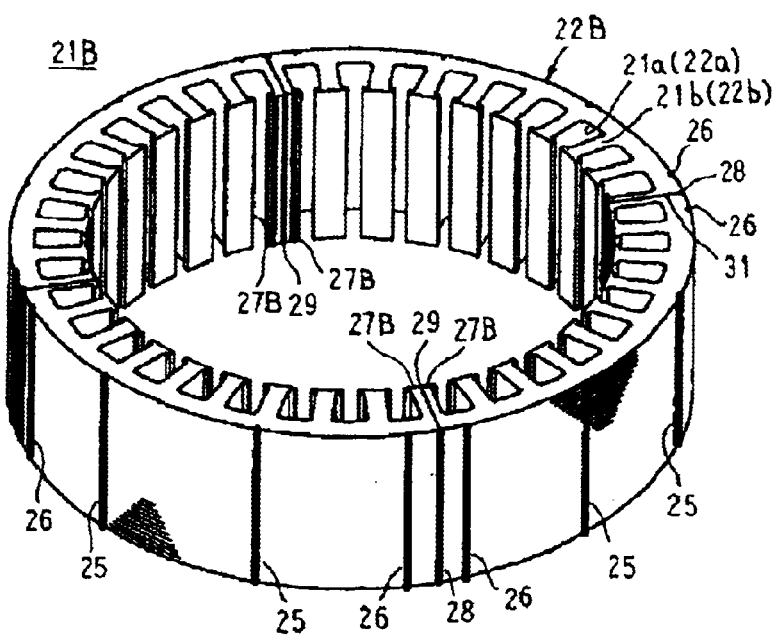
FIG. 5 is a perspective showing a stator core for an automotive alternator according to Embodiment 3 of the present invention.

In Embodiment 3, as shown in FIG. 5, first inner plate-joining weld portions 27B are formed so as to extend in an axial direction on first and second sides of the inner core-joining weld portions 29 on the core teeth 21b constituting the abutted portions 31 of each of four laminated core divisions 22B. Second outer plate-joining weld portions 25, first outer plate-joining weld portions 26, and the first inner plate-joining weld portions 27B are formed by welding at predetermined positions on the inner surfaces and outer surfaces of a laminated body formed by laminating a predetermined number of the thin magnetic plates 24.

Moreover, the rest of this embodiment is constructed in a similar manner to Embodiment 1 above.

In Embodiment 3, because the second outer plate-joining weld portions 25, the first outer plate-joining weld portions 26, and the first inner plate-joining weld portions 27B are formed by welding at predetermined positions on the inner surfaces and the outer surfaces of a laminated body formed by laminating a predetermined number of the thin magnetic plates 24, the laminated thin magnetic plates 24 are joined firmly to each other.

Thus, in Embodiment 3, the tooth tip surfaces at the first and circumferential ends of the laminated core divisions 22B are also prevented from becoming irregular, etc., in a similar manner to Embodiment 1 above. In addition, in a stator composed of the star-shaped winding units 3 installed in a stator core 21B constituted by the laminated core divisions 22B, the electrically-insulating coating of the conductor wires 1 is also less likely to be damaged, providing superior electrical insulation.

According to Embodiment 3, because the first inner plate-joining weld portions 27B are formed on the tip surfaces of the core teeth 21b constituting the abutted portions 31, portions of the thin magnetic plates 24 constituting the division teeth 22b at the first and second circumferential ends of the laminated body, where irregularities in the teeth tip portions occur easily when the laminated body is bent, are reliably joined, reliably suppressing the occurrence of irregularities in the teeth tip portions.

Because the first inner plate-joining weld portions 27B are formed on the tip surfaces of the core teeth 21b, the first inner plate-joining weld portions 27B are eliminated from the core back portions which are a main passage for magnetic flux, suppressing deterioration of magnetic resistance due to the disposition of the first inner plate-joining weld portions 27B.

Because the first inner plate-joining weld portions 27B and the inner core-joining weld portions 29 are formed only on the tip surfaces of the core teeth 21b constituting the abutted portions 31 of the laminated core divisions 22B, the number of welds is reduced significantly compared to Embodiment 2 above in which the weld portions are formed on the tip surfaces of all of the core teeth 21b, enabling declines in output and worsening of electromagnetic noise due to surface roughness resulting from welding of the tip surfaces of the core teeth 21b to be suppressed.

Embodiment 4

In Embodiment 1 above, the cylindrical stator core 21 is prepared by abutting four laminated core divisions 22 each bent into an arc shape, but in Embodiment 4, a cylindrical stator core 21C is prepared by abutting one laminated core 32 bent into an annular shape.

In Embodiment 4, thin magnetic plates 24A of predetermined length are prepared by press forming a strip-shaped body composed of a magnetic material. A plurality of plate teeth are formed at a predetermined pitch in a longitudinal direction on the thin magnetic plates 24A. Plate teeth at first and second ends are formed into two matching sections.

Figure 7:
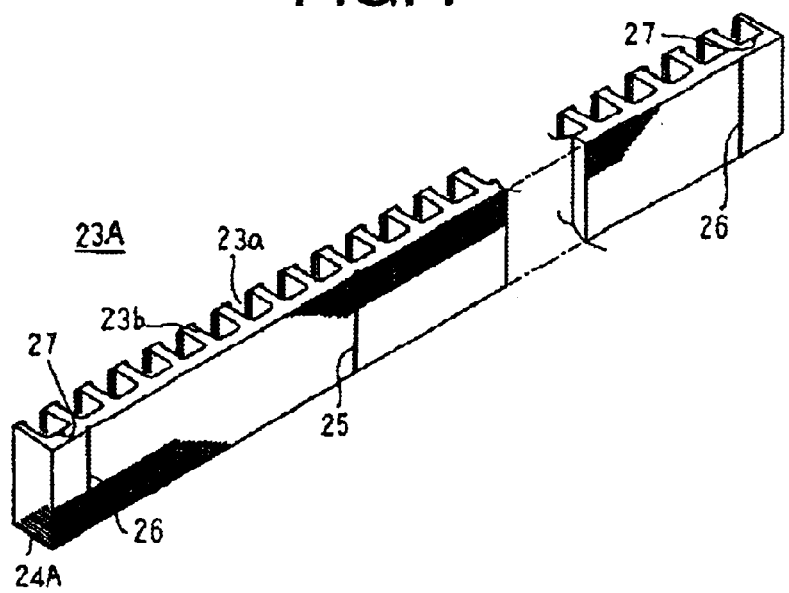
FIG. 7 is a perspective showing a laminated body constituting the stator core for an automotive alternator according to Embodiment 4 of the present invention.

Next, a laminated body 23A is prepared by laminating a predetermined number of the thin magnetic plates 24A such that the plate teeth are superposed, and integrating the laminated thin magnetic plates 24A by welding predetermined positions on an outer surface (a surface on the opposite side from the teeth) and inner surfaces (surfaces on the same side as the teeth) thereof. On the laminated body 23A, as shown in FIG. 7, second outer plate-joining weld portions 25 are formed on the outer surface of the laminated body 23A over an entire width region of the laminated body 23A at positions that divide the longitudinal direction of the laminated body 23A into four sections (three positions). First outer plate-joining weld portions 26 are formed over an entire width region of the laminated body 23A on the outer surface of the laminated body 23A at positions corresponding to second body teeth 23b from the outside at the first and second ends of the laminated body 23A. First inner plate-joining weld portions 27 are formed over an entire width region of the laminated body 23A on the bottom surfaces of body slots 23a at the first and second ends of the laminated body 23A.

Figure 6:
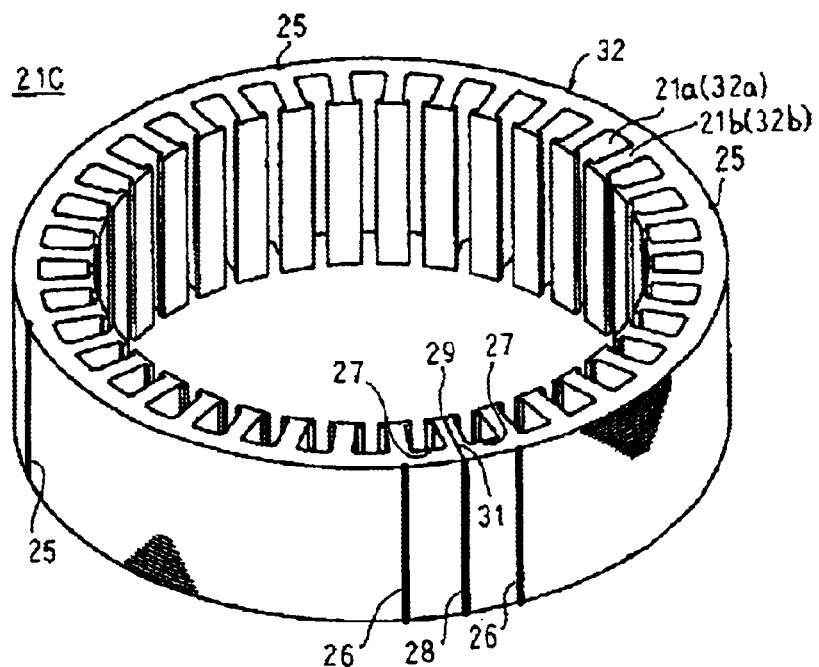
FIG. 6 is a perspective showing a stator core for an automotive alternator according to Embodiment 4 of the present invention.

Next, the laminated body 23A is bent into an annular shape with the openings of the body slots 23a facing the inner circumferential side to obtain a laminated core 32. First and second circumferential ends of the laminated core 32 prepared in this manner are abutted to each other and an outer circumferential surface and an inner circumferential surface of the abutted portion 31 are welded to obtain a cylindrical stator core 21C, as shown in FIG. 6. Here, an outer core-joining weld portion 28 is formed over an entire axial region on an outer circumferential surface of the abutted portion 31. An inner core-joining weld portion 29 is formed over an entire axial region on an inner circumferential surface of the abutted portion 31. Moreover, the inner core-joining weld portion 29 is formed on the tip surface of a core tooth 21b so as to join the teeth divided into two matching sections on the laminated core 32.

One outer core-joining weld portion 28 and three second outer plate-joining weld portions 25 are formed at an even angular pitch on the outer circumferential surface of the stator core 21C. Two first outer plate-joining weld portions 26 are formed in a pair next to the outer core-joining weld portion 28 on first and second circumferential sides of the outer core-joining weld portion 28. One inner core-joining weld portion 29 is formed on the outer circumferential surface of the stator core 21C on the tip surface of the core tooth 21b constituting the abutted portion 31 of the laminated core 32. In addition, two first inner plate-joining weld portions 27 are formed in a pair on the bottom surfaces of the core slots 21a on first and second circumferential sides of the inner core-joining weld portion 29. Here, the first and second outer plate-joining weld portions 26 and 25 are each formed radially outside a core tooth 21b. The core slots 21a (32a) defined by adjacent pairs of the core teeth 21b (32b) are formed so as to be arranged at an even angular pitch in a circumferential direction with slot grooves lying in an axial direction and slot openings facing an inner circumferential side.

In Embodiment 4, because the second outer plate-joining weld portions 25, the first outer plate-joining weld portions 26, and the first inner plate-joining weld portions 27 are formed by welding at predetermined positions on the inner surfaces and the outer surfaces of a laminated body 23A formed by laminating a predetermined number of the thin magnetic plates 24A, the laminated thin magnetic plates 24A are joined firmly to each other.

Thus, in Embodiment 4, the tooth tip surfaces at the first and second circumferential ends of the laminated core 32 are also prevented from becoming irregular, etc., in a similar manner to Embodiment 1 above. In addition, in a stator composed of the star-shaped winding units 3 installed in a stator core 21C constituted by the laminated core 32, the electrically-insulating coating of the conductor wires 1 is also less likely to be damaged, providing superior electrical insulation.

According to Embodiment 4, because the cylindrical stator core 21C is prepared by abutting one laminated core 32 bent into an annular shape, the rate of production of the stator core 21C is improved compared to Embodiment 1 above in which the cylindrical stator core 21 is prepared by abutting four laminated core divisions 22.

Because the stator core 21C is constituted by one laminated core 32, there is only one abutted portion 31 where roundness is poor compared to other portions, providing a stator core 21C having good roundness. Because there is only one abutted portion 31, the stator core 21C having good roundness can be obtained by applying a sizing process by ironing.

Because the first outer plate-joining weld portions 26 are formed radially outside the core teeth 21b, declines in output due to the formation of the first outer plate-joining weld portions 26 can be suppressed compared to Embodiment 1 above in which the first outer plate-joining weld portions 26 are formed radially outside the core slots 21a.

Because the first outer plate-joining weld portions 26 are formed on an outer circumferential side of the second body teeth 23b from the first and second ends of the laminated body 23A, there is no deterioration in bending due to weld hardening at the first outer plate-joining weld portions 26. Thus, because bending of the end portions of the laminated body 23A is facilitated, the stator core 21C having good roundness can be obtained by deforming the end portions of the laminated body 23A into the curved shape of the stator core 21C before bending the rest of the laminated body 23A into the annular shape.

Embodiment 5

In Embodiment 4 above, the star-shaped winding units 3 are installed in the cylindrical stator core 21C in which the laminated core 32 bent into the annular shape is abutted and welded, but in Embodiment 5, a stator 20A is prepared by mounting the laminated body 23A with flat plate-shaped winding units 16, bending the laminated body 23A into an annular shape together with the flat plate-shaped winding units 16, and abutting and welding the bent laminated core 32.

Figure 8:
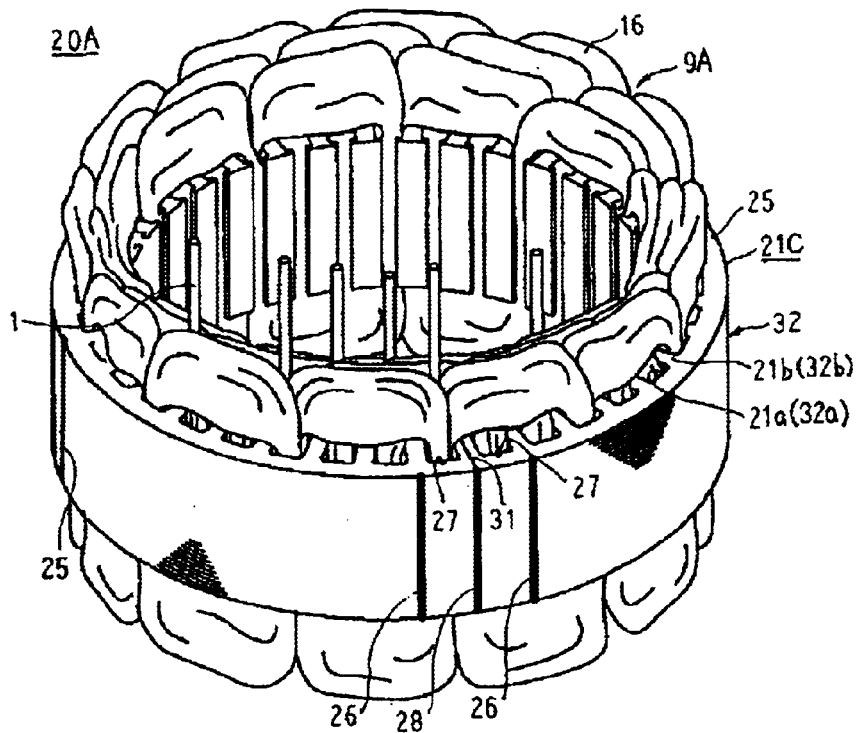
FIG. 8 is a perspective showing a stator for an automotive alternator according to Embodiment 5 of the present invention.
Figure 9:
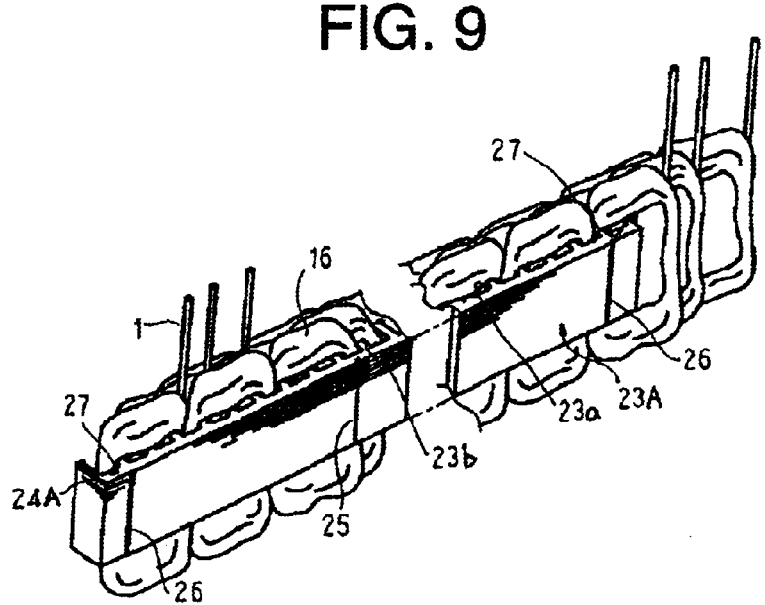
FIG. 9 is a perspective showing a laminated body mounted with winding units in a method for manufacturing the stator for an automotive alternator according to Embodiment 5 of the present invention.

In Embodiment 5, weld depths of the first and second outer plate-joining weld portions 25 and 26 and the first inner plate-joining weld portions 27 on the laminated core 23A deepen toward edge portions in width directions of the laminated body 23A (axial directions of the stator core 21C). The flat plate-shaped winding units 16 constituting a stator winding 9A are each formed into a flat plate shape by winding a conductor wire 1 into a wave shape for a predetermined number of winds. As shown in FIG. 9, the flat plate-shaped winding units 16 are mounted to the laminated body 23A from the opening ends of the body slots 23a. Next, the laminated body 23A mounted with the flat plate-shaped winding units 16 is bent into an annular shape. Hence, the laminated core 32 mounted with the flat plate-shaped winding units 16 is obtained. Thus, the stator 20A in which the stator winding 9A is installed in the cylindrical stator core 21C, as shown in FIG. 8, is obtained by abutting first and second ends of the laminated core 32 and welding an outer circumferential surface and an inner circumferential surface of the abutted portion 31.

In Embodiment 5, because the laminated body 23A mounted with the flat plate-shaped winding units 16 is bent into an annular shape, installation of the stator winding 9A is facilitated, improving the rate of production and the space factor of the stator 20A in addition to the effects of Embodiment 4 above.

Because the weld depths of the first and second outer plate-joining weld portions 25 and 26 and the first inner plate-joining weld portions 27 on the laminated body 23A deepen toward the edge portions in the width directions of the laminated body 23A (axial directions of the stator core 21C), the thin magnetic plates 24A at the edge portions in the width directions of the laminated body 23A are securely joined. Thus, the thin magnetic plates 24A at the edge portions in the width directions of the laminated body 23A are prevented from peeling off due to stress generated by the bending of the flat plate-shaped winding units 16 acting on the laminated body 23A, and the stator core 23C is prevented from deforming.

Moreover, in Embodiment 5, in cases where second outer plate-joining weld portions 30 are applied to tooth tip surfaces, the weld depths of the second outer plate joining weld portions 30 may be made to deepen toward the edge portions in the width directions of the laminated body 23A. In that case, the thin magnetic plates 24A at the edge portions in the width directions of the laminated body 23A are more securely joined, and peeling off of the thin magnetic plates 24A at the edge portions in the width directions of the laminated body 23A and deformation of the stator core 23C are reliably prevented.

Embodiment 6

In Embodiment 5 above, the stator 20A is prepared by mounting the flat plate-shaped winding units 16 to the laminated body 23A, bending the laminated body 23A the winding units 16 into an annular shape, and abutting and welding the bent laminated core 32, but in Embodiment 6, a stator 20B is prepared by mounting winding assemblies 35 to a laminated body 23B, bending the laminated body 23B together with the winding assemblies 35 into an annular shape, and abutting and welding the bent laminated core 32A.

Figure 10:
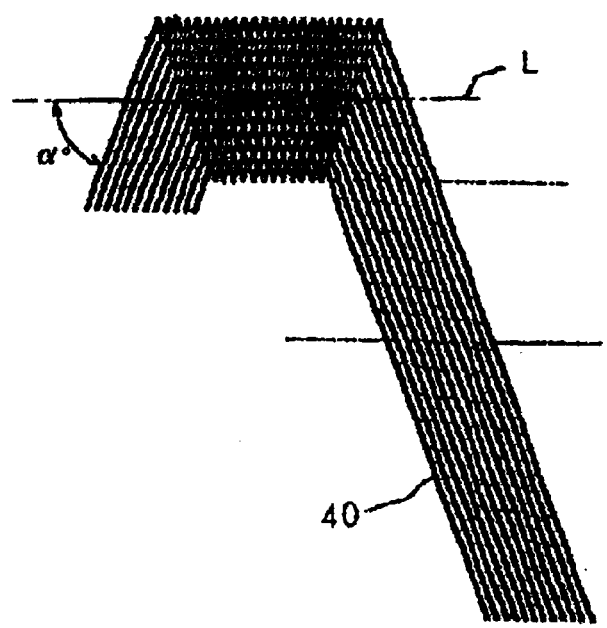
FIG. 10 is a diagram explaining a method for manufacturing a stator winding used in a stator for an automotive alternator according to Embodiment 6 of the present invention.

A method for preparing the winding assemblies 35 will now be explained with reference to FIGS. 10 to 12.

First, twelve continuous conductor wires 40 are lined up at a pitch of one slot on a plane. Then, as shown in FIG. 10, the twelve continuous conductor wires 40 are folded over together at a predetermined pitch (at the positions of the double-dotted chain lines), forming a strip-shaped winding unit 41 in which the twelve continuous conductor wires 40 are wound into a helical shape so as to be inclined at an angle of α degrees relative to a center line L, as shown in FIG. 11. The continuous conductor wires 40 are each composed of a copper wire having a rectangular cross section coated with an electrical insulator.

A first pair of pin groups 42 is inserted between the continuous conductor wires 40 from a front side of the strip-shaped winding unit 41 at positions separated by a distance D relative to a width direction of the strip-shaped winding unit 41. Similarly, a second pair of pin groups 42 is inserted between the continuous conductor wires 40 from a rear side of the strip-shaped winding unit 41 at positions separated by a distance D in a width direction of the strip-shaped winding unit 41. In addition, position-regulating pin groups 43 are inserted between the continuous conductor wires 40 at edge portions in a width direction of the strip-shaped winding unit 41. Hence, the first, second, and position-regulating pin groups 42 and 43 are set as shown in FIG. 11. Here, the distance D generally matches a groove length of the slots 23a of the laminated body 23A (an axial length of the stator core 21C).

Figure 11:
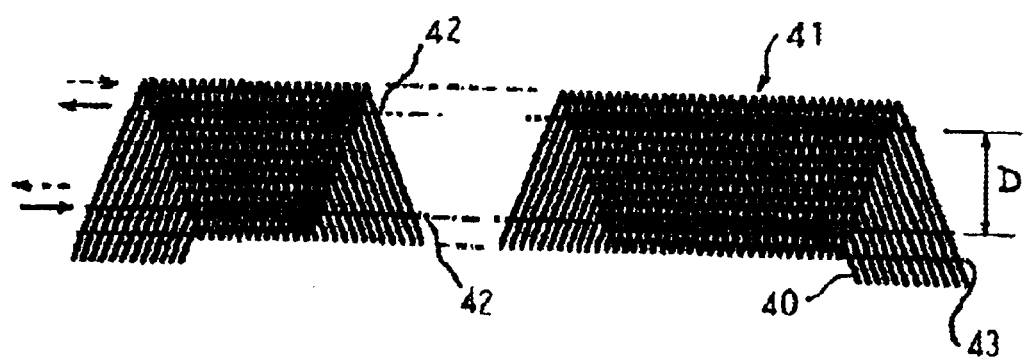
FIG. 11 is another diagram explaining the method for manufacturing the stator winding used in the stator for an automotive alternator according to Embodiment 6 of the present invention.

Then, the pin groups 42 in the first pair of pin groups 42 inserted between the continuous conductor wires 40 from the front side of the strip-shaped winding unit 41 are moved in mutually opposite directions in a longitudinal direction of the strip-shaped winding unit 41, as indicated by solid arrows in FIG. 11. Similarly, the pin groups 42 in the second pair of pin groups 42 inserted between the continuous conductor wires 40 from the rear side of the strip-shaped winding unit 41 are moved in mutually opposite directions in the longitudinal direction of the strip-shaped winding unit 41, as indicated by broken arrows in FIG. 11. At this time, the continuous conductor wires 40 are prevented from coming apart because the position-regulating pin groups 43 are inserted between the continuous conductor wires 40.

Thus, the portions of the continuous conductor wires 40 positioned between the pairs of pin groups 42 are deformed so as to become perpendicular to the longitudinal direction of the strip-shaped winding unit 41, becoming straight portions 40a for housing inside the body slots 23a. The portions of the continuous conductor wires 40 positioned outside the pairs of pin groups 42 become turn portions 40b linking straight portions 40a six slots apart.

Figure 12:
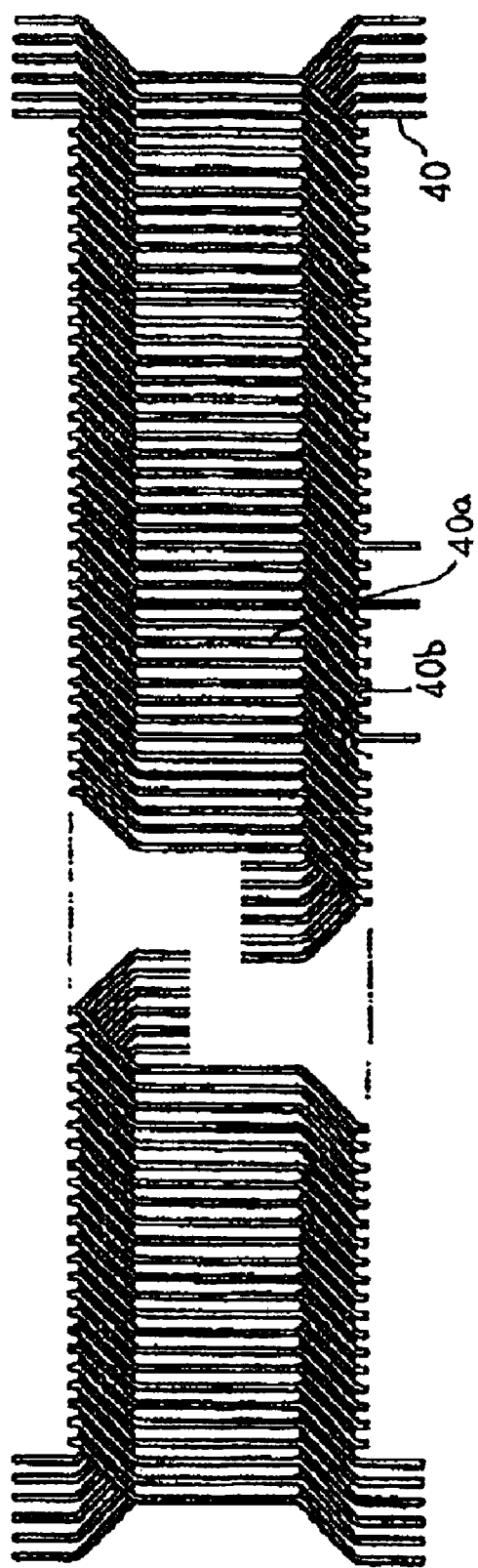
FIG. 12 is a plan showing a winding assembly constituting the stator winding of the stator for an automotive alternator according to Embodiment 6 of the present invention.

The winding assembly 35 shown in FIG. 12 is prepared in this manner. The winding assembly 35 is constructed such that pairs of the straight portions 40a which are stacked in a direction that is perpendicular to the surface of the page in FIG. 12 (corresponding to the thickness direction of the winding assembly 35) are arranged at a pitch of one slot and any given straight portion 40a on a first side in the thickness direction of a first pair of the straight portions 40a is joined by a turn portion 40b to a straight portion 40a on a second side in the thickness direction of a second pair of the straight portions 40a six slots away. In other words, the winding assembly 35 is constructed such that the continuous conductor wires 40 are formed into a pattern in which the straight portions 40a are disposed at a pitch of six slots and linked by the turn portions 40b, and adjacent pairs of the straight portions 40a are alternately offset by a width of the continuous conductor wires 40 on a first and second side in the width direction (the direction of disposal of the straight portions 40a) by the turn portions 40b, pairs of continuous conductor wires 40 being formed by disposing two continuous conductor wires 40 so as to be offset by a pitch of six slots from each other with straight portions 40a superposed, six pairs of continuous conductor wires 40 being offset by a pitch of one slot from each other. Moreover, portions extending outward from the turn portions 40b in FIG. 12 correspond to lead wires.

Next, a method for preparing the stator 20B will be explained with reference to FIGS. 13 and 14. Now, in Embodiment 5 above, the laminated body 23A is used, in which thirty-six slots 23a are formed for twelve poles (a ratio of one slot per phase per pole), but in Embodiment 6, because the ratio is two slots per phase per pole for sixteen poles, the laminated body 23B is used, in which ninety-six slots 23a are formed.

Figure 13:
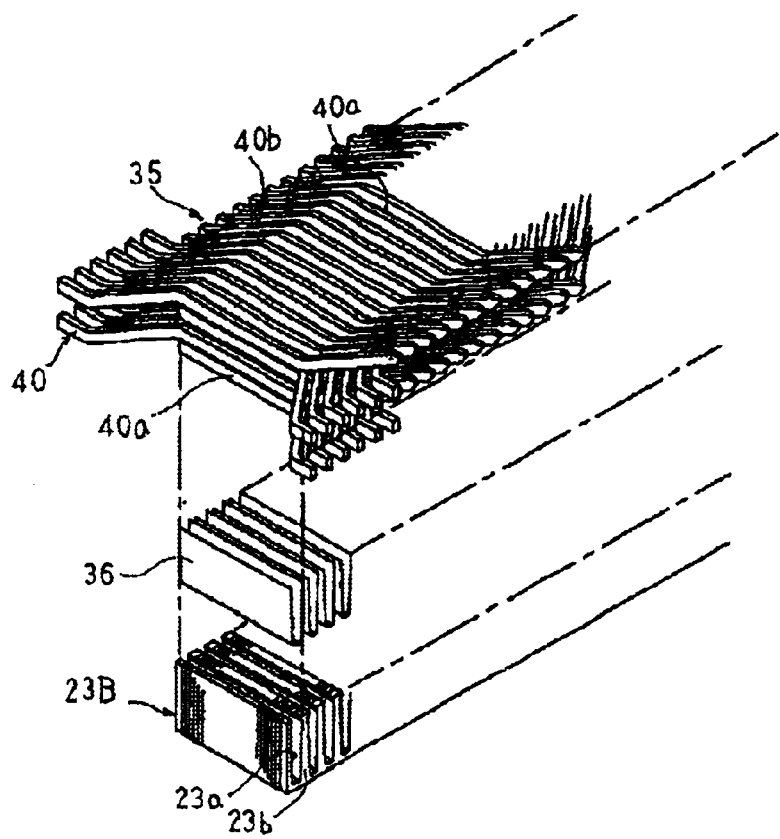
FIG. 13 is a perspective explaining a process for mounting the winding assembly into a laminated body in the method for manufacturing the stator for an automotive alternator according to Embodiment 6 of the present invention.
Figure 14:
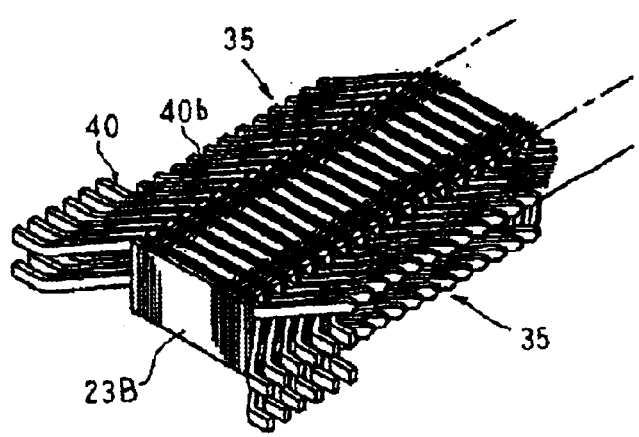
FIG. 14 is a perspective explaining a state in which the winding assembly is mounted into the laminated body in the method for manufacturing the stator for an automotive alternator according to Embodiment 6 of the present invention.

First, as shown in FIG. 13, an insulator 36 is mounted to each of the slots 23a of the laminated body 23B, and two winding assemblies 35 are stacked and mounted to the laminated body 23B from the opening ends of the body slots 23a. Hence, the winding assemblies 35 are mounted to the laminated body 23B such that four straight portions 40a are housed in the body slots 23a so as to line up in a single row in a slot depth direction with the longitudinal axes of the rectangular cross sections thereof aligned in the slot depth direction.

Figure 15:
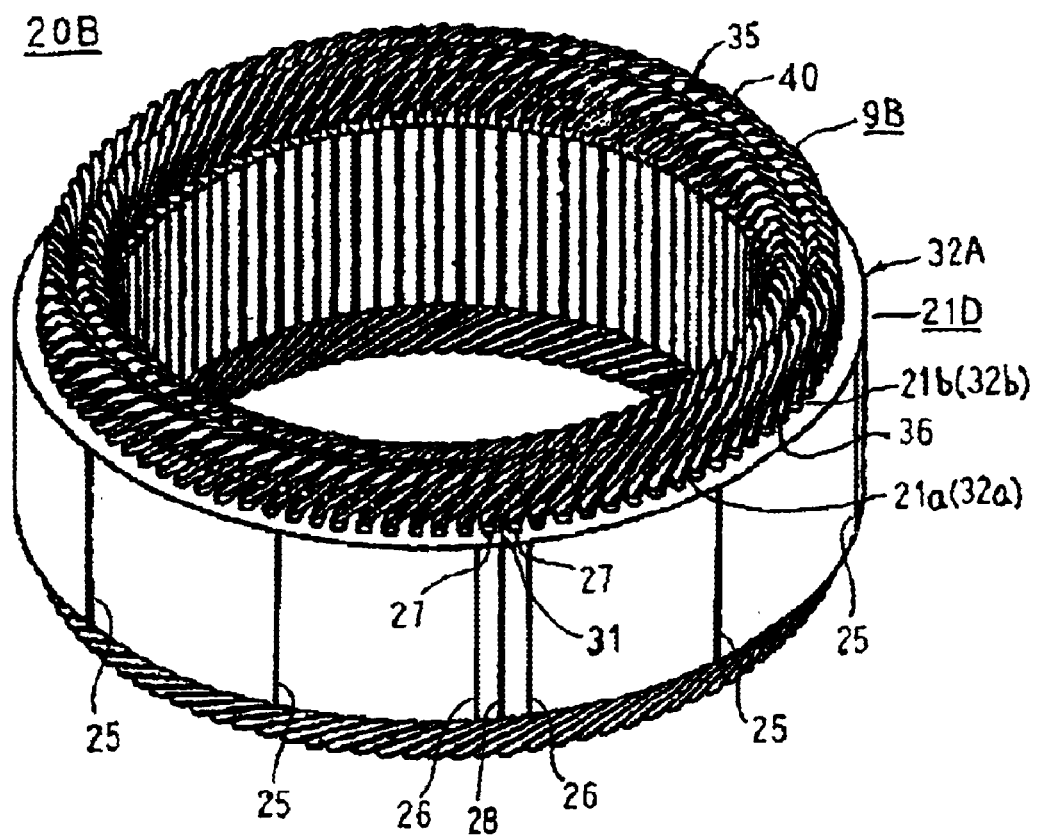
FIG. 15 is a perspective showing the stator for an automotive alternator according to Embodiment 6 of the present invention.
Figure 16:
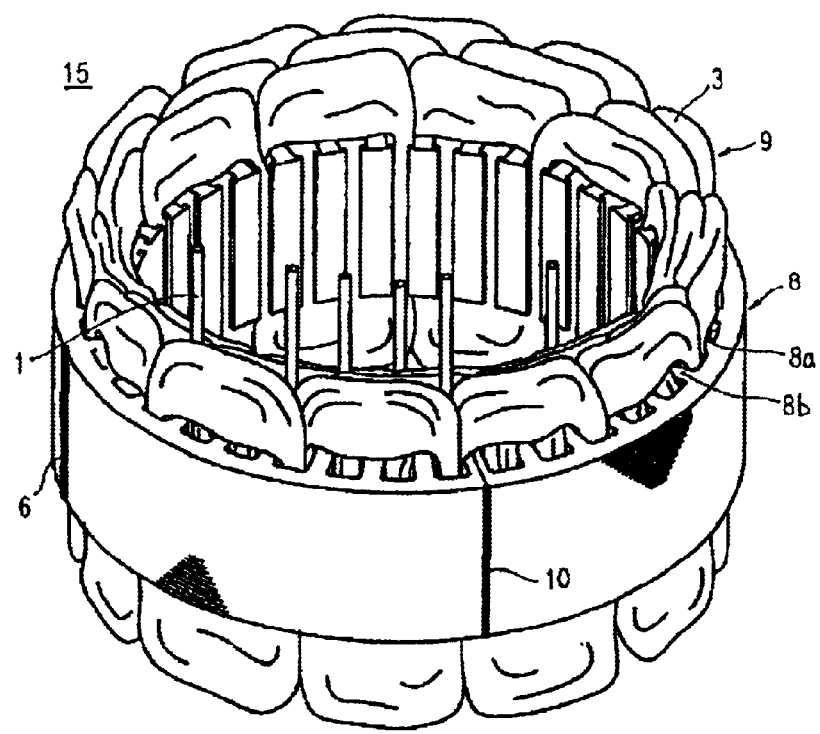
FIG. 16 is a perspective showing a conventional stator for an automotive alternator.
Figure 17:
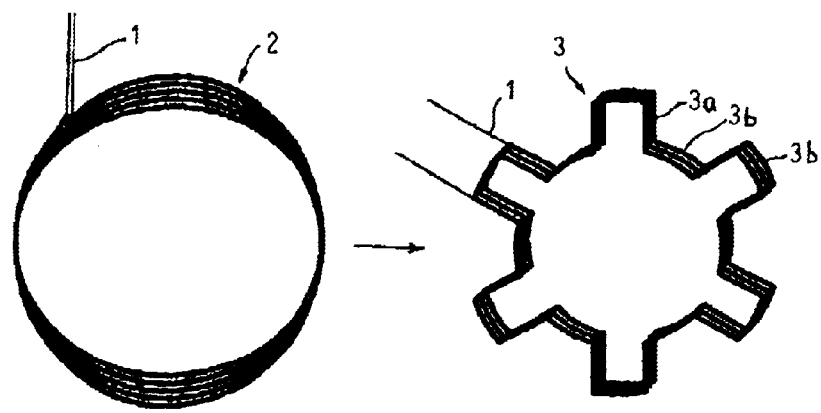
FIG. 17 is a diagram explaining a method for manufacturing a stator winding used in the conventional stator for an automotive alternator.
Figure 18:
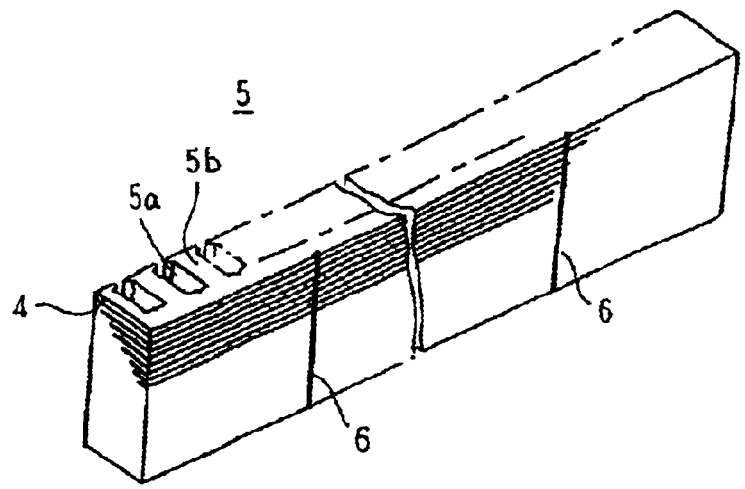
FIG. 18 is a perspective showing a laminated body constituting a stator core used in the conventional stator for an automotive alternator.
Figure 19:
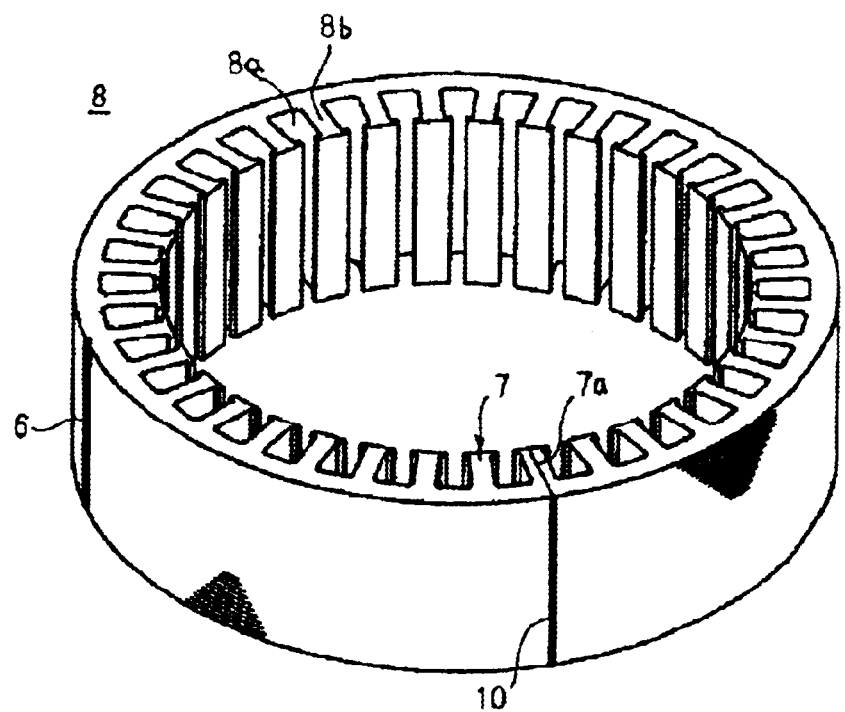
FIG. 19 is a perspective showing the stator core used in the conventional stator for an automotive alternator.
Figure 21:
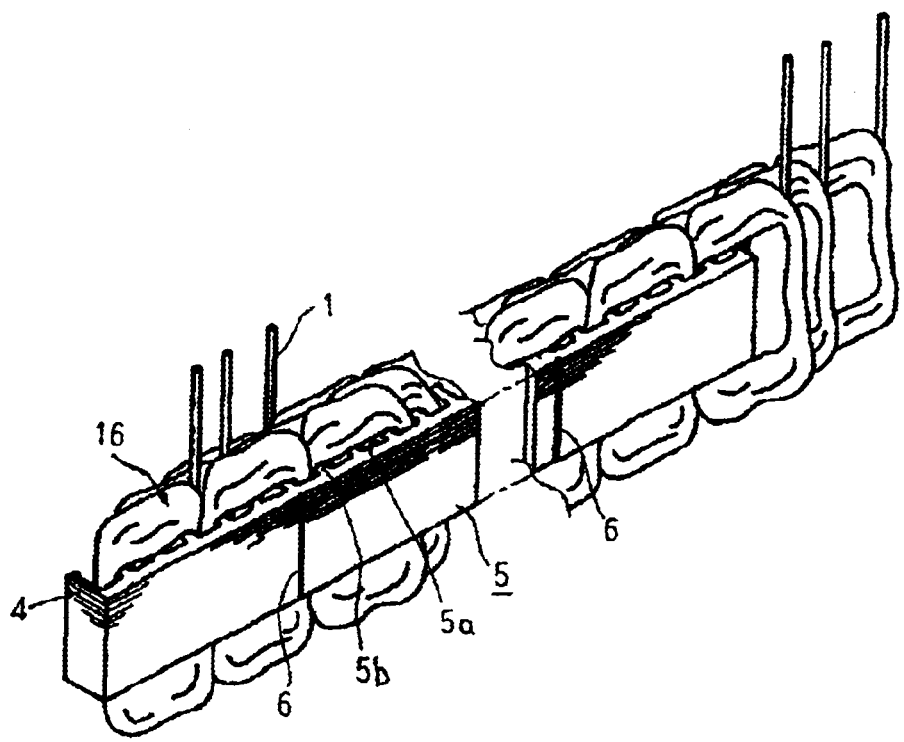
FIG. 21 is a diagram explaining a method for manufacturing a stator for a conventional automotive alternator proposed as an improvement.
Figure 22:
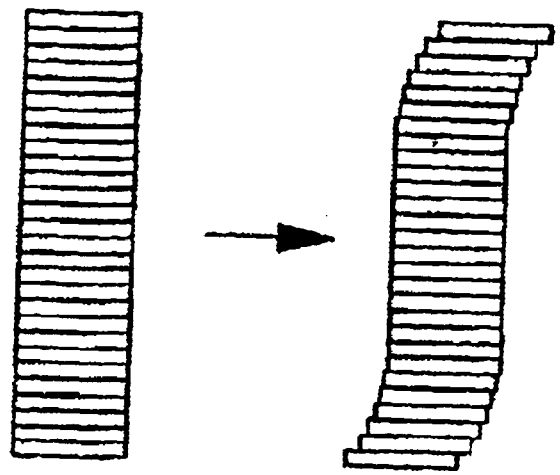
FIG. 22 is a diagram explaining an example of irregularities in the tooth tip surfaces in the stator core of the conventional automotive alternator.
Figure 23:
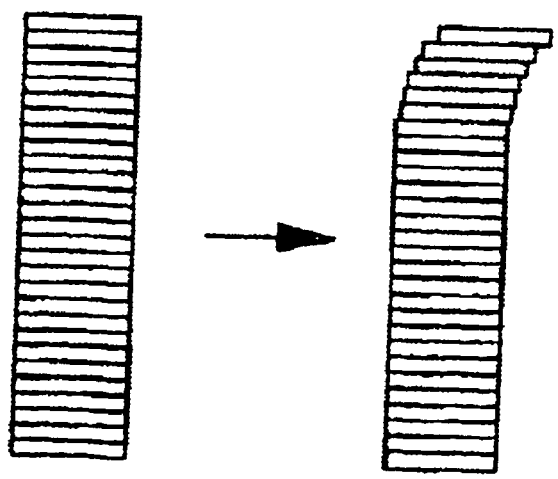
FIG. 23 is a diagram explaining another example of irregularities in the tooth tip surfaces in the stator core of the conventional automotive alternator.

Thereafter, the laminated body 23B mounted with the two winding assemblies 35 is bent into an annular shape, first and second ends of the laminated core 32A bent into the annular shape are abutted, and the abutted portion 31 is laser welded to obtain a cylindrical stator core 21D mounted with the two winding assemblies 35. In addition, predetermined connections are made among the continuous conductor wires 40 to obtain the stator 20B shown in FIG. 15. A stator winding 9B is constituted by the two winding assemblies 35.

In Embodiment 6, because the second outer plate-joining weld portions 25, the first outer plate-joining weld portions 26, and the first inner plate-joining a weld portions 27 are formed by welding at predetermined positions on the inner surfaces and the outer surfaces of the laminated body 23B, which is formed by laminating a predetermined number of the thin magnetic plates 24A, the laminated thin magnetic plates 24A are joined firmly to each other.

Thus, in Embodiment 6, the tooth tip surfaces at the first and second circumferential ends of the laminated core 32A are also prevented from becoming irregular, etc., in a similar manner to Embodiment 5 above. In addition, in the stator 20B composed of the winding assemblies 35 installed in the stator core 21D constituted by the laminated core 32A, the electrically-insulating coating on the continuous conductor wires 40 is also less likely to be damaged, providing superior electrical insulation.

In Embodiment 5 above, because the flat plate-shaped winding units 16 that are mounted to the laminated body 23A are prepared by winding the slender conductor wires 1 into a wave shape, the conductor wires 1 in the coil ends and the slot-housed portions of the flat plate-shaped winding units 16 are in an unaligned state. Thus, there is a limit to improvements in space factor, and a shaping operation is required for the coil ends, facilitating the occurrence of short-circuiting between the conductor wires 1.

In Embodiment 6, because winding assemblies 35 are used in which twelve continuous conductor wires 40 formed into a wave shape so as to alternately occupy an inner layer and an outer layer in a slot depth direction in every sixth core slot 21a are constructed into one body, the straight portions 40a are housed so as to be arranged in single rows inside the core slots 21a, enabling the space factor to be improved further. Because the turn portions 40b are disposed so as to be arranged in rows in a circumferential direction to form two rows on end surfaces of the stator core 21D, coil end groups can be made compact, and short-circuiting among the coil ends is prevented.

Because alignment of the straight portions 40a and the turn portions 40b in the winding assemblies 35 is increased and the shapes thereof are uniform, the occurrence of short-circuiting between the continuous conductor wires 40 and the stator core 21D during bending of the laminated body 23B is prevented.

Moreover, in each of the above embodiments, stators and stator cores used in automotive alternators are explained, but the present invention is not limited to stators and stator cores for automotive alternators; similar effects can also be achieved if the present invention is applied to other dynamo-electric machines, for example, stators and stator cores for electric motors.

In each of the above embodiments, the second outer plate-joining weld portions 25 are explained as being disposed at positions dividing the longitudinal direction of the outer surfaces of the laminated bodies 23 and 23A into even sections, but the second outer plate-joining weld portions 25 may also be disposed at positions dividing the outer circumferential surface of a stator core formed into an annular shape into even sections in a circumferential direction. In addition, the second outer plate-joining weld portions 25 do not necessarily have to be disposed at an even angular pitch; they need only be disposed at positions joining the laminated thin magnetic plates securely to each other such that irregularities do not arise on the tooth tip surfaces when the laminated bodies 23 and 23A are bent.

In each of the above embodiments, each of the joining weld portions is disposed at an even angular pitch in a circumferential direction on the outer circumferential surfaces and the inner circumferential surfaces of an annular stator core, but each of the joining weld portions may also be disposed at an uneven angular pitch to intentionally change the resonance mode of the stator core with the aim of suppressing vibrations in the stator core.

The first outer plate-joining weld portions 26 and the first inner plate-joining weld portions 27 should be disposed between second outer plate-joining weld portions 25 positioned near circumferential end portions of the laminated body and the circumferential end portions of the laminated body. In order to ensure bonding between portions of the thin magnetic plates constituting the circumferential end portions of the laminated body, it is desirable that the first outer plate-joining weld portions 26 and the first inner plate-joining weld portions 27 be disposed in the vicinity of the circumferential end portions of the laminated body, more specifically, within a pitch of two slots from the circumferential end portions of the laminated body.

The present invention is constructed in the above manner and exhibits the effects described below.

As explained above, according to one aspect of the present invention, there is provided a stator core for a dynamoelectric machine, the stator core being formed into a cylindrical shape by abutting at least one laminated core division shaped by bending a rectangular parallelepiped laminated body;

the laminated body being formed by laminating a plurality of thin strip-shaped magnetic plates in which a plurality of teeth extending perpendicular to a longitudinal direction are formed at a predetermined spacing in the longitudinal direction; and a plurality of slots defined by adjacent pairs of the teeth being formed in a circumferential direction of the stator core such that slot grooves lie in an axial direction of the stator core and slot openings face an inner circumferential side of the stator core, wherein an inner and an outer core-joining weld portion for joining and integrating the abutted portion of the laminated core division are formed so as to extend in an axial direction on an inner circumferential side and an outer circumferential side of the abutted portion of the laminated core division, first inner and first outer plate-joining weld portions for joining and integrating the laminated thin magnetic plates are formed so as to extend in the axial direction in proximity to the inner and outer core-joining weld portions on inner circumferential surfaces and outer circumferential surfaces at first and second circumferential end portions of the laminated core division, and a second outer plate-joining weld portion for joining and integrating the laminated thin magnetic plates is formed so as to extend in an axial direction on an outer circumferential surface of the laminated core division, thereby providing a stator core for a dynamoelectric machine in which the occurrence of irregularities is suppressed in the tooth tip surfaces of the laminated body at the first and second end portions during bending of the laminated body.

Weld depths of the first inner and first outer plate-joining weld portions and the second outer plate-joining weld portion may vary relative to an axial direction, increasing weld strength of predetermined portions of the laminated thin magnetic plates constituting the laminated body, thereby suppressing deformation during bending of the laminated body.

The first inner plate-joining weld portions may be formed on inner circumferential surfaces of tips of the teeth, suppressing the occurrence of irregularities in the tooth tip surfaces of the first and second ends of the laminated body where rigidity is low during bending of the laminated body.

The abutted portion of the laminated core division may be positioned on a circumferentially-central portion of one of the teeth, the first inner plate-joining weld portions being formed on mutually opposite sides of the inner core-joining weld portion on the tooth constituting the abutted portion, increasing the rigidity of the first and second ends of the laminated body where irregularities in the tooth tip surfaces occur easily during bending of the laminated body, thereby suppressing the occurrence of irregularities in the tooth tip surfaces.

Second inner plate-joining weld portions for joining and integrating the laminated thin magnetic plates may be formed so as to extend in an axial direction on inner circumferential surfaces of tips of all of the teeth except for the teeth on which the first inner plate-joining weld portions are formed, increasing the rigidity of each of the tooth tip portions, thereby suppressing the occurrence of irregularities in each of the tooth tip surfaces.

A weld depth of the second inner plate-joining weld portion may vary relative to an axial direction, increasing weld strength of predetermined portions of the laminated thin magnetic plates constituting the laminated body, thereby suppressing deformation during bending of the laminated body.

The first and second outer plate-joining weld portions may be positioned radially outside the teeth, suppressing the deterioration of magnetic resistance due to welding.

According to another aspect of the present invention, there is provided a stator for a dynamoelectric machine including:

a cylindrical stator core in which a plurality of slots defined by adjacent pairs of teeth are formed in a circumferential direction such that slot grooves lie in an axial direction and slot openings face an inner circumferential side; and a stator winding installed in the stator core, wherein the stator core is formed into a cylindrical shape by abutting first and second circumferential end surfaces of a laminated core shaped by bending a rectangular parallelepiped laminated body into an annular shape, the laminated body being formed by laminating a plurality of thin strip-shaped magnetic plates in which a plurality of teeth extending so as to be perpendicular to a longitudinal direction are formed at a predetermined spacing in the longitudinal direction, an inner and an outer core-joining weld portion for joining and integrating the abutted portion of the laminated core are formed so as to extend in an axial direction on an inner circumferential side and an outer circumferential side of the abutted portion of the laminated core, first inner and first outer plate-joining weld portions for joining and integrating the laminated thin magnetic plates are formed so as to extend in the axial direction in proximity to the inner and outer core-joining weld portions on inner circumferential surfaces and outer circumferential surfaces at first and second circumferential end portions of the laminated core, and a second outer plate-joining weld portion for joining and integrating the laminated thin magnetic plates is formed so as to extend in an axial direction on an outer circumferential surface of the laminated core, whereby the occurrence of irregularities in the tooth tip surfaces of the stator core is suppressed, thereby providing a stator for a dynamoelectric machine enabled suppression of the deterioration of electrical insulation resulting from the irregularities in the tooth tip surfaces.

Weld depths of the first inner and first outer plate-joining weld portions and the second outer plate-joining weld portion may vary relative to an axial direction, increasing weld strength of predetermined portions of the laminated thin magnetic plates constituting the laminated body, thereby suppressing deformation during bending of the laminated body.

The first inner plate-joining weld portions may be formed on inner circumferential surfaces of tips of the teeth, suppressing the occurrence of irregularities in the tooth tip surfaces of the first and second ends of the laminated body where rigidity is low during bending of the laminated body, thereby enabling electrical insulation to be improved.

The abutted portion of the laminated core may be positioned on a circumferentially-central portion of one of the teeth, the first inner plate-joining weld portions being formed on mutually opposite sides of the inner core-joining weld portion on the tooth constituting the abutted portion, increasing the rigidity of the first and second ends of the laminated body where irregularities in the tooth tip surfaces occur easily during bending of the laminated body, thereby suppressing the occurrence of irregularities in the tooth tip surfaces and enabling electrical insulation to be further improved.

Second inner plate-joining weld portions for joining and integrating the laminated thin magnetic plates may be formed so as to extend in an axial direction on inner circumferential surfaces of tips of all of the teeth except for the teeth on which the first inner plate-joining weld portions are formed, increasing the rigidity of each of the tooth tip portions, thereby suppressing the occurrence of irregularities in each of the tooth tip surfaces and enabling electrical insulation to be reliably improved.

A weld depth of the second inner plate-joining weld portion may vary relative to an axial direction, increasing weld strength of predetermined portions of the laminated thin magnetic plates constituting the laminated body, thereby suppressing deformation during bending of the laminated body.

The first and second outer plate-joining weld portions may be positioned radially outside the teeth, suppressing the deterioration of magnetic resistance due to welding.

The rectangular parallelepiped laminated body may be shaped by bending into an annular shape with the stator winding mounted in the slots, improving the mounting of the stator winding and suppressing turning up of the thin magnetic plates resulting from mounting of the stator winding.

The stator winding may be installed such that a conductor wire alternately occupies an inner layer and an outer layer in a slot depth direction in the slots at intervals of a predetermined number of slots, increasing alignment of the winding and also making the shape of the winding uniform, thereby enabling suppression of short-circuiting among the conductor wires and short-circuiting between the conductor wires and the stator core resulting from bending of the laminated body.

According to yet another aspect of the present invention, there is provided a method for manufacturing a stator core for a dynamoelectric machine including the steps of:

preparing thin magnetic plates of a predetermined length from a strip-shaped body composed of a magnetic material, a plurality of teeth being formed on the thin magnetic plates at a predetermined spacing;

preparing a rectangular parallelepiped laminated body by laminating a predetermined number of the thin magnetic plates such that the teeth are superposed on each other;

forming a second outer plate-joining weld portion by welding a predetermined position on an outer surface of the laminated body so as to extend across an entire width region of the outer surface, the outer surface being on an opposite side from the teeth;

forming first outer plate-joining weld portions by welding a vicinity of first and second longitudinal end portions on the outer surface of the laminated body so as to extend across an entire width region of the outer surface of the laminated body;

forming first inner plate-joining weld portions by welding a vicinity of first and second longitudinal end portions on an inner surface of the laminated body so as to extend across an entire width region of the inner surface of the laminated body;

preparing a laminated core division by bending the laminated body on which the first and the second outer plate-joining weld portions and the first inner plate-joining weld portions are formed; and integrating the laminated core division into a cylindrical shape by abutting at least one of the laminated core divisions and welding an outer surface and an inner surface of the abutted portion thereof so as to extend across an entire axial region of the laminated core division, thereby providing a method for manufacturing a stator core for a dynamoelectric machine enabling the occurrence of irregularities in the tooth tip surfaces to be suppressed while manufacturing the stator core.

The first inner plate-joining weld portions may be formed on inner circumferential surfaces of tips of the teeth, suppressing the occurrence of irregularities in the tooth tip surfaces of the first and second ends of the laminated body where rigidity is low during bending of the laminated body.

The abutted portion of the laminated core division may be positioned on a circumferentially-central portion of one of the teeth, the first inner plate-joining weld portions being formed on mutually opposite sides of an inner core joining weld portion formed by welding the inner surface of the abutted portion on the tooth constituting the abutted portion, increasing the rigidity of the first and second ends of the laminated body where irregularities in the tooth tip surfaces occur easily during bending of the laminated body, thereby suppressing the occurrence of irregularities in the tooth tip surfaces.

Second inner plate-joining weld portions may be formed by welding inner circumferential surfaces of tips of all of the teeth except for the teeth on which the first inner plate-joining weld portions are formed so as to extend across an entire axial region, formation of the second inner plate-joining weld portions being performed before preparing the laminated core division by bending the laminated body, increasing the rigidity of each of the tooth tip portions, thereby suppressing the occurrence of irregularities in each of the tooth tip surfaces during bending of the laminated body.

Although the preferred embodiments of the present invention have been described above, it should be understood that the present invention is not limited thereto and that other modifications will be apparent to those skilled in the art without departing from the sprint of the invention.

The scope of the present invention, therefore, should be determined solely by the appended claims.

What is claimed is:

1. A stator core for a dynamoelectric machine,
   said stator core being formed into a cylindrical shape by abutting at least one laminated core division shaped by bending a rectangular parallelepiped laminated body;
   said laminated body being formed by laminating a plurality of thin strip-shaped magnetic plates in which a plurality of teeth extending perpendicular to a longitudinal direction are formed at a predetermined spacing in said longitudinal direction; and
   a plurality of slots defined by adjacent pairs of said teeth being formed in a circumferential direction of said stator core such that slot grooves lie in an axial direction of said stator core and slot openings face an inner circumferential side of said stator core,
   wherein an inner and an outer core-joining weld portion for joining and integrating an abutting end surface of said laminated core division are formed so as to extend in an axial direction on an inner circumferential side and an outer circumferential side of an abutting end surface of said laminated core division,
   first inner and first outer plate-joining weld portions for joining and integrating said laminated thin magnetic plates are formed so as to extend in said axial direction in proximity to said inner and outer core joining weld portions on inner circumferential surfaces and outer circumferential surfaces at first and second circumferential end portions of said laminated core division, and
   a second outer plate-joining weld portion for joining and integrating said laminated thin magnetic plates is formed so as to extend in an axial direction on an outer circumferential surface of said laminated core division.

2. The stator core for a dynamoelectric machine according to claim 1 wherein weld depths of said first inner and first outer plate-joining weld portions and said second outer plate-joining weld portion vary relative to an axial direction.

3. The stator core for a dynamoelectric machine according to claim 1 wherein said first inner plate-joining weld portions are formed on inner circumferential surfaces of tips of said teeth.

4. The stator core for a dynamoelectric machine according to claim 3 wherein said abutting end surface of said laminated core division is positioned on a circumferentially-central portion of one of said teeth, said first inner plate-joining weld portions being formed on mutually opposite sides of said inner core-joining weld portion on said tooth constituting said abutting end surface.

5. The stator core for a dynamoelectric machine according to claim 3 wherein second inner plate-joining weld portions for joining and integrating said laminated thin magnetic plates are formed so as to extend in an axial direction on inner circumferential surfaces of tips of all of said teeth except for said teeth on which said first inner plate-joining weld portions are formed.

6. The stator core for a dynamoelectric machine according to claim 5 wherein a weld depth of said second inner plate-joining weld portion varies relative to an axial direction.

7. The stator core for a dynamoelectric machine according to claim 1 wherein said first and second outer plate-joining weld portions are positioned radially outside said teeth.

8. A stator for a dynamoelectric machine comprising:
   a cylindrical stator core in which a plurality of slots defined by adjacent pairs of teeth are formed in a circumferential direction such that slot grooves lie in an axial direction and slot openings face an inner circumferential side; and
   a stator winding installed in said stator core,
   wherein said stator core is formed into a cylindrical shape by abutting first and second circumferential end surfaces of a laminated core shaped by bending a rectangular parallelepiped laminated body into an annular shape, said laminated body being formed by laminating a plurality of thin strip-shaped magnetic plates in which a plurality of teeth extending so as to be perpendicular to a longitudinal direction are formed at a predetermined spacing in said longitudinal direction, an inner and an outer core-joining weld portion for joining and integrating said abutting end surface of said laminated core are formed so as to extend in an axial direction on an inner circumferential side and an outer circumferential side of said abutting end surface of said laminated core, first inner and first outer plate-joining weld portions for joining and integrating said laminated thin magnetic plates are formed so as to extend in said axial direction in proximity to said inner and outer core-joining weld portions on inner circumferential surfaces and outer circumferential surfaces at first and second circumferential end portions of said laminated core, and a second outer plate-joining weld portion for joining and integrating said laminated thin magnetic plates is formed so as to extend in an axial direction on an outer circumferential surface of said laminated core.

9. The stator for a dynamoelectric machine according to claim 8 wherein weld depths of said first inner and first outer plate-joining weld portions and said second outer plate-joining weld portion vary relative to an axial direction.

10. The stator for a dynamoelectric machine according to claim 8 wherein said first inner plate-joining weld portions are formed on inner circumferential surfaces of tips of said teeth.

11. The stator for a dynamoelectric machine according to claim 10 wherein said abutting end surface of said laminated core is positioned on a circumferentially-central portion of one of said teeth, said first inner plate-joining weld portions being formed on mutually opposite sides of said inner core-joining weld portion on said tooth constituting said abutting end surfaces.

12. The stator for a dynamoelectric machine according to claim 10 second inner plate-joining weld portions for joining and integrating said laminated thin magnetic plates are formed so as to extend in an axial direction on inner circumferential surfaces of tips of all of said teeth except for said teeth on which said first inner plate-joining weld portions are formed.

13. The stator for a dynamoelectric machine according to claim 12 wherein a weld depth of said second inner plate-joining weld portion varies relative to an axial direction.

14. The stator for a dynamoelectric machine according to claim 8 wherein said first and second outer plate-joining weld portions are positioned radially outside said teeth.

15. The stator for a dynamoelectric machine according to claim 8 wherein said rectangular parallelepiped laminated body is shaped by bending into an annular shape with said stator winding mounted in said slots.

16. The stator for a dynamoelectric machine according to claim 15 wherein said stator winding is installed such that a conductor wire alternately occupies an inner layer and an outer layer in a slot depth direction in said slots at intervals of a predetermined number of slots.

* * * * *